(12) United States Patent
Okarski et al.

(10) Patent No.: US 12,484,961 B2
(45) Date of Patent: Dec. 2, 2025

(54) MECHANICAL RETAINER SYSTEMS FOR ELECTRODES OF A BASKET CATHETER, AND METHODS OF THE SAME

(71) Applicant: Biosense Webster (Israel) Ltd., Yokneam (IL)

(72) Inventors: Kevin Mark Okarski, Monrovia, CA (US); Keshava Datta, Chino Hills, CA (US); Abubakarr Bah, Irvine, CA (US); Thanh Nguyen, El Monte, CA (US)

(73) Assignee: Biosense Webster (Israel) Ltd., Yokneam (IL)

( * ) Notice: Subject to any disclaimer, the term of this patent is extended or adjusted under 35 U.S.C. 154(b) by 462 days.

(21) Appl. No.: 18/066,049

(22) Filed: Dec. 14, 2022

(65) Prior Publication Data

US 2023/0225790 A1     Jul. 20, 2023

Related U.S. Application Data

(60) Provisional application No. 63/301,142, filed on Jan. 20, 2022.

(51) Int. Cl.
*A61B 18/14* (2006.01)
*A61B 17/00* (2006.01)
*A61B 18/00* (2006.01)

(52) U.S. Cl.
CPC ............ *A61B 18/1492* (2013.01); *A61B 2017/00526* (2013.01); *A61B 2018/00083* (2013.01);
(Continued)

(58) Field of Classification Search
CPC ........... A61B 18/1492; A61B 18/14; A61B 2018/0016; A61B 2018/00267;
(Continued)

(56) References Cited

U.S. PATENT DOCUMENTS

| | | | |
|---|---|---|---|
| 4,699,147 | A | 10/1987 | Chilson et al. |
| 4,940,064 | A | 7/1990 | Desai |

(Continued)

FOREIGN PATENT DOCUMENTS

| | | | |
|---|---|---|---|
| CN | 105761835 | A | 7/2016 |
| CN | 111248993 | A | 6/2020 |

(Continued)

OTHER PUBLICATIONS

Extended European Search Report and Opinion dated Jun. 15, 2023, from corresponding European Application No. 23152480.2.

(Continued)

*Primary Examiner* — Joseph A Stoklosa
*Assistant Examiner* — Marina Delaney Templeton

(57) ABSTRACT

The disclosed technology includes a medical probe comprising a tubular shaft having a proximal end and a distal end, the tubular shaft extending along a longitudinal axis. The medical probe further comprises an expandable basket assembly coupled to the distal end of the tubular shaft. The basket assembly includes a plurality of electrodes with each electrode of the plurality of electrodes having a lumen therethrough. The basket assembly further includes a plurality of spines extending along the longitudinal axis and configured to bow radially outward from the longitudinal axis when the expandable basket assembly is transitioned from a collapsed form to an expanded form. Each spine includes a proximal and a distal end and a strut passing through the lumen of an electrode. The strut includes a mechanical retainer disposed on the strut to prevent the electrode from sliding proximally or distally along a length of the spine.

14 Claims, 14 Drawing Sheets

(52) U.S. Cl.
CPC ............... *A61B 2018/0016* (2013.01); *A61B 2018/00267* (2013.01); *A61B 2018/00351* (2013.01); *A61B 2018/00577* (2013.01); *A61B 2018/00613* (2013.01); *A61B 2018/1467* (2013.01); *A61B 2018/1475* (2013.01); *A61B 2218/003* (2013.01)

(58) Field of Classification Search
CPC ........... A61B 2018/00214; A61B 2018/00184; A61B 2018/1495; A61B 2018/00577; A61B 5/6858; A61B 2562/043
See application file for complete search history.

(56) References Cited

U.S. PATENT DOCUMENTS

| | | | |
|---|---|---|---|
| 5,215,103 A | 6/1993 | Desai | |
| 5,255,679 A | 10/1993 | Imran | |
| 5,293,869 A | 3/1994 | Edwards et al. | |
| 5,309,910 A | 5/1994 | Edwards et al. | |
| 5,313,943 A | 5/1994 | Houser et al. | |
| 5,324,284 A | 6/1994 | Imran | |
| 5,345,936 A | 9/1994 | Pomeranz et al. | |
| 5,365,926 A | 11/1994 | Desai | |
| 5,396,887 A | 3/1995 | Imran | |
| 5,400,783 A | 3/1995 | Pomeranz et al. | |
| 5,411,025 A | 5/1995 | Webster, Jr. | |
| 5,415,166 A | 5/1995 | Imran | |
| 5,456,254 A | 10/1995 | Pietroski et al. | |
| 5,465,717 A | 11/1995 | Imran et al. | |
| 5,476,495 A | 12/1995 | Kordis et al. | |
| 5,499,981 A | 3/1996 | Kordis | |
| 5,526,810 A | 6/1996 | Wang | |
| 5,546,940 A | 8/1996 | Panescu et al. | |
| 5,549,108 A | 8/1996 | Edwards et al. | |
| 5,558,073 A | 9/1996 | Pomeranz et al. | |
| 5,577,509 A | 11/1996 | Panescu et al. | |
| 5,595,183 A | 1/1997 | Swanson et al. | |
| 5,598,848 A | 2/1997 | Swanson et al. | |
| 5,609,157 A | 3/1997 | Panescu et al. | |
| 5,628,313 A | 5/1997 | Webster, Jr. | |
| 5,681,280 A | 10/1997 | Rusk et al. | |
| 5,718,241 A | 2/1998 | Ben-Haim et al. | |
| 5,722,401 A | 3/1998 | Pietroski et al. | |
| 5,722,403 A | 3/1998 | McGee et al. | |
| 5,725,525 A | 3/1998 | Kordis | |
| 5,730,128 A | 3/1998 | Pomeranz et al. | |
| 5,772,590 A | 6/1998 | Webster, Jr. | |
| 5,782,239 A | 7/1998 | Webster, Jr. | |
| 5,782,899 A | 7/1998 | Imran | |
| 5,823,189 A | 10/1998 | Kordis | |
| 5,881,727 A | 3/1999 | Edwards | |
| 5,893,847 A * | 4/1999 | Kordis | A61B 5/287 600/374 |
| 5,904,680 A | 5/1999 | Kordis et al. | |
| 5,911,739 A | 6/1999 | Kordis et al. | |
| 5,928,228 A | 7/1999 | Kordis et al. | |
| 5,944,022 A | 8/1999 | Nardella et al. | |
| 5,968,040 A | 10/1999 | Swanson et al. | |
| 5,983,126 A | 11/1999 | Wittkampf | |
| 6,014,579 A | 1/2000 | Pomeranz et al. | |
| 6,014,590 A | 1/2000 | Whayne et al. | |
| 6,023,638 A * | 2/2000 | Swanson | A61B 5/6855 606/41 |
| 6,119,030 A | 9/2000 | Morency | |
| 6,198,974 B1 | 3/2001 | Webster, Jr. | |
| 6,216,043 B1 | 4/2001 | Swanson et al. | |
| 6,216,044 B1 | 4/2001 | Kordis | |
| 6,428,537 B1 | 8/2002 | Swanson et al. | |
| 6,456,864 B1 | 9/2002 | Swanson et al. | |
| 6,484,118 B1 | 11/2002 | Govari | |
| 6,574,492 B1 | 6/2003 | Ben-Haim et al. | |
| 6,584,345 B2 | 6/2003 | Govari | |
| 6,600,948 B2 | 7/2003 | Ben-Haim et al. | |
| 6,738,655 B1 | 5/2004 | Sen et al. | |
| 6,741,878 B2 | 5/2004 | Fuimaono et al. | |
| 6,748,255 B2 | 6/2004 | Fuimaono et al. | |
| 6,780,183 B2 | 8/2004 | Jimenez, Jr. et al. | |
| 6,837,886 B2 | 1/2005 | Collins et al. | |
| 6,866,662 B2 | 3/2005 | Fuimaono et al. | |
| 6,892,091 B1 | 5/2005 | Ben-Haim et al. | |
| 6,970,730 B2 | 11/2005 | Fuimaono et al. | |
| 6,973,340 B2 | 12/2005 | Fuimaono et al. | |
| 6,980,858 B2 | 12/2005 | Fuimaono et al. | |
| 6,987,995 B2 | 1/2006 | Drysen | |
| 7,048,734 B1 | 5/2006 | Fleischman et al. | |
| 7,142,903 B2 | 11/2006 | Rodriguez et al. | |
| 7,149,563 B2 | 12/2006 | Fuimaono et al. | |
| 7,255,695 B2 | 8/2007 | Falwell et al. | |
| 7,257,434 B2 | 8/2007 | Fuimaono et al. | |
| 7,274,957 B2 | 9/2007 | Drysen | |
| 7,377,906 B2 | 5/2008 | Selkee | |
| 7,399,299 B2 | 7/2008 | Daniel et al. | |
| 7,410,486 B2 | 8/2008 | Fuimaono et al. | |
| 7,522,950 B2 | 4/2009 | Fuimaono et al. | |
| 7,591,799 B2 | 9/2009 | Selkee | |
| 7,593,760 B2 | 9/2009 | Rodriguez et al. | |
| RE41,334 E | 5/2010 | Beatty et al. | |
| 7,720,517 B2 | 5/2010 | Drysen | |
| 7,846,157 B2 | 12/2010 | Kozel | |
| 7,853,302 B2 | 12/2010 | Rodriguez et al. | |
| 7,930,018 B2 | 4/2011 | Harlev et al. | |
| 8,000,765 B2 | 8/2011 | Rodriguez et al. | |
| 8,007,495 B2 | 8/2011 | McDaniel et al. | |
| 8,021,327 B2 | 9/2011 | Selkee | |
| 8,048,063 B2 | 11/2011 | Aeby et al. | |
| 8,103,327 B2 | 1/2012 | Harlev et al. | |
| 8,167,845 B2 | 5/2012 | Wang et al. | |
| 8,224,416 B2 | 7/2012 | De La Rama et al. | |
| 8,235,988 B2 | 8/2012 | Davis et al. | |
| 8,275,440 B2 | 9/2012 | Rodriguez et al. | |
| 8,295,902 B2 | 10/2012 | Salahieh et al. | |
| 8,346,339 B2 | 1/2013 | Kordis et al. | |
| 8,357,152 B2 | 1/2013 | Govari et al. | |
| 8,435,232 B2 | 5/2013 | Aeby et al. | |
| 8,447,377 B2 | 5/2013 | Harlev et al. | |
| 8,475,450 B2 | 7/2013 | Govari et al. | |
| 8,498,686 B2 | 7/2013 | Grunewald | |
| 8,517,999 B2 | 8/2013 | Pappone et al. | |
| 8,545,490 B2 | 10/2013 | Mihajlovic et al. | |
| 8,560,086 B2 | 10/2013 | Just et al. | |
| 8,567,265 B2 | 10/2013 | Aeby et al. | |
| 8,712,550 B2 | 4/2014 | Grunewald | |
| 8,728,065 B2 | 5/2014 | Fish et al. | |
| 8,755,861 B2 | 6/2014 | Harlev et al. | |
| 8,825,130 B2 | 9/2014 | Just et al. | |
| 8,906,011 B2 | 12/2014 | Gelbart et al. | |
| 8,945,120 B2 | 2/2015 | McDaniel et al. | |
| 8,979,839 B2 | 3/2015 | De La Rama et al. | |
| 9,037,264 B2 | 5/2015 | Just et al. | |
| 9,131,980 B2 | 9/2015 | Bloom | |
| 9,204,929 B2 | 12/2015 | Solis | |
| 9,277,960 B2 | 3/2016 | Weinkam et al. | |
| 9,314,208 B1 | 4/2016 | Altmann et al. | |
| 9,339,331 B2 | 5/2016 | Tegg et al. | |
| 9,486,282 B2 | 11/2016 | Solis | |
| 9,554,718 B2 | 1/2017 | Bar-Tal et al. | |
| D782,686 S | 3/2017 | Werneth et al. | |
| 9,585,588 B2 | 3/2017 | Marecki et al. | |
| 9,597,036 B2 | 3/2017 | Aeby et al. | |
| 9,687,297 B2 | 6/2017 | Just et al. | |
| 9,693,733 B2 | 7/2017 | Altmann et al. | |
| 9,782,099 B2 | 10/2017 | Williams et al. | |
| 9,788,895 B2 | 10/2017 | Solis | |
| 9,801,681 B2 | 10/2017 | Laske et al. | |
| 9,814,618 B2 | 11/2017 | Nguyen et al. | |
| 9,833,161 B2 | 12/2017 | Govari | |
| 9,848,795 B2 | 12/2017 | Marecki et al. | |
| 9,894,756 B2 | 2/2018 | Weinkam et al. | |
| 9,895,073 B2 | 2/2018 | Solis | |
| 9,907,609 B2 | 3/2018 | Cao et al. | |
| 9,974,460 B2 | 5/2018 | Wu et al. | |
| 9,986,949 B2 | 6/2018 | Govari et al. | |
| 9,993,160 B2 | 6/2018 | Salvestro et al. | |

(56) References Cited

U.S. PATENT DOCUMENTS

| | | |
|---|---|---|
| 10,014,607 B1 | 7/2018 | Govari et al. |
| 10,028,376 B2 | 7/2018 | Weinkam et al. |
| 10,034,637 B2 | 7/2018 | Harlev et al. |
| 10,039,494 B2 | 8/2018 | Altmann et al. |
| 10,045,707 B2 | 8/2018 | Govari |
| 10,078,713 B2 | 9/2018 | Auerbach et al. |
| 10,111,623 B2 | 10/2018 | Jung et al. |
| 10,130,420 B2 | 11/2018 | Basu et al. |
| 10,136,828 B2 | 11/2018 | Houben et al. |
| 10,143,394 B2 | 12/2018 | Solis |
| 10,172,536 B2 | 1/2019 | Maskara et al. |
| 10,182,762 B2 | 1/2019 | Just et al. |
| 10,194,818 B2 | 2/2019 | Williams et al. |
| 10,201,311 B2 | 2/2019 | Chou et al. |
| 10,219,860 B2 | 3/2019 | Harlev et al. |
| 10,219,861 B2 | 3/2019 | Just et al. |
| 10,231,328 B2 | 3/2019 | Weinkam et al. |
| 10,238,309 B2 | 3/2019 | Bar-Tal et al. |
| 10,278,590 B2 | 5/2019 | Salvestro et al. |
| D851,774 S | 6/2019 | Werneth et al. |
| 10,314,505 B2 | 6/2019 | Williams et al. |
| 10,314,507 B2 | 6/2019 | Govari et al. |
| 10,314,648 B2 | 6/2019 | Ge et al. |
| 10,314,649 B2 | 6/2019 | Bakos et al. |
| 10,342,608 B2 | 7/2019 | Wang et al. |
| 10,349,855 B2 | 7/2019 | Zeidan et al. |
| 10,350,003 B2 | 7/2019 | Weinkam et al. |
| 10,362,991 B2 | 7/2019 | Tran et al. |
| 10,375,827 B2 | 8/2019 | Weinkam et al. |
| 10,376,170 B2 | 8/2019 | Quinn et al. |
| 10,376,221 B2 | 8/2019 | Iyun et al. |
| 10,398,348 B2 | 9/2019 | Osadchy et al. |
| 10,403,053 B2 | 9/2019 | Katz et al. |
| 10,441,188 B2 | 10/2019 | Katz et al. |
| 10,470,682 B2 | 11/2019 | Deno et al. |
| 10,470,714 B2 | 11/2019 | Altmann et al. |
| 10,482,198 B2 | 11/2019 | Auerbach et al. |
| 10,492,857 B2 | 12/2019 | Guggenberger et al. |
| 10,542,620 B2 | 1/2020 | Weinkam et al. |
| 10,575,743 B2 | 3/2020 | Basu et al. |
| 10,575,745 B2 | 3/2020 | Solis |
| 10,582,871 B2 | 3/2020 | Williams et al. |
| 10,582,894 B2 | 3/2020 | Ben Zrihem et al. |
| 10,596,346 B2 | 3/2020 | Aeby et al. |
| 10,602,947 B2 | 3/2020 | Govari et al. |
| 10,617,467 B2 | 4/2020 | Viswanathan et al. |
| 10,617,867 B2 | 4/2020 | Viswanathan et al. |
| 10,660,702 B2 | 5/2020 | Viswanathan et al. |
| 10,667,753 B2 | 6/2020 | Werneth et al. |
| 10,674,929 B2 | 6/2020 | Houben et al. |
| 10,681,805 B2 | 6/2020 | Weinkam et al. |
| 10,682,181 B2 | 6/2020 | Cohen et al. |
| 10,687,892 B2 | 6/2020 | Long et al. |
| 10,688,278 B2 | 6/2020 | Beeckler et al. |
| 10,702,178 B2 | 7/2020 | Dahlen et al. |
| 10,716,477 B2 | 7/2020 | Salvestro et al. |
| 10,758,304 B2 | 9/2020 | Aujla |
| 10,765,371 B2 | 9/2020 | Hayam et al. |
| 10,772,566 B2 | 9/2020 | Aujila |
| 10,799,281 B2 | 10/2020 | Goertzen et al. |
| 10,842,558 B2 | 11/2020 | Harlev et al. |
| 10,842,561 B2 | 11/2020 | Viswanathan et al. |
| 10,863,914 B2 | 12/2020 | Govari et al. |
| 10,881,376 B2 | 1/2021 | Shemesh et al. |
| 10,898,139 B2 | 1/2021 | Guta et al. |
| 10,905,329 B2 | 2/2021 | Bar-Tal et al. |
| 10,912,484 B2 | 2/2021 | Ziv-Ari et al. |
| 10,918,306 B2 | 2/2021 | Govari et al. |
| 10,939,871 B2 | 3/2021 | Altmann et al. |
| 10,952,795 B2 | 3/2021 | Cohen et al. |
| 10,973,426 B2 | 4/2021 | Williams et al. |
| 10,973,461 B2 | 4/2021 | Baram et al. |
| 10,987,045 B2 | 4/2021 | Basu et al. |
| 11,006,902 B1 | 5/2021 | Bonyak et al. |
| 11,040,208 B1 | 6/2021 | Govari et al. |
| 11,045,628 B2 | 6/2021 | Beeckler et al. |
| 11,051,877 B2 | 7/2021 | Sliwa et al. |
| 11,071,585 B2 | 7/2021 | Zhang et al. |
| 11,109,788 B2 | 9/2021 | Rottmann et al. |
| 11,116,435 B2 | 9/2021 | Urman et al. |
| 11,129,574 B2 | 9/2021 | Cohen et al. |
| 11,160,482 B2 | 11/2021 | Solis |
| 11,164,371 B2 | 11/2021 | Yellin et al. |
| 2002/0198522 A1 | 12/2002 | Kordis et al. |
| 2004/0210121 A1 | 10/2004 | Fuimaono et al. |
| 2006/0009689 A1 | 1/2006 | Fuimaono et al. |
| 2006/0009690 A1 | 1/2006 | Fuimaono et al. |
| 2006/0058813 A1 | 3/2006 | Teague et al. |
| 2006/0100669 A1 | 5/2006 | Fuimaono et al. |
| 2007/0093806 A1 | 4/2007 | Desai et al. |
| 2007/0276212 A1 | 11/2007 | Fuimaono et al. |
| 2008/0234564 A1 | 9/2008 | Beatty et al. |
| 2010/0063478 A1* | 3/2010 | Selkee ............... A61B 18/1492 604/524 |
| 2011/0118726 A1 | 5/2011 | De La Rama et al. |
| 2011/0160574 A1 | 6/2011 | Harlev et al. |
| 2011/0190625 A1 | 8/2011 | Harlev et al. |
| 2011/0245756 A1 | 10/2011 | Arora et al. |
| 2011/0301597 A1 | 12/2011 | McDaniel et al. |
| 2012/0271136 A1 | 10/2012 | Kordis et al. |
| 2012/0271138 A1 | 10/2012 | Kordis et al. |
| 2012/0271140 A1 | 10/2012 | Kordis et al. |
| 2013/0090651 A1 | 4/2013 | Smith |
| 2013/0150693 A1 | 6/2013 | D'Angelo |
| 2013/0172715 A1 | 7/2013 | Just et al. |
| 2013/0172872 A1 | 7/2013 | Subramaniam et al. |
| 2013/0172883 A1 | 7/2013 | Lopes et al. |
| 2013/0178850 A1 | 7/2013 | Lopes et al. |
| 2013/0190587 A1 | 7/2013 | Lopes et al. |
| 2013/0296852 A1 | 11/2013 | Madjarov et al. |
| 2014/0025069 A1 | 1/2014 | Willard et al. |
| 2014/0052118 A1 | 2/2014 | Laske et al. |
| 2014/0180147 A1 | 6/2014 | Thakur et al. |
| 2014/0180151 A1 | 6/2014 | Maskara et al. |
| 2014/0180152 A1 | 6/2014 | Maskara et al. |
| 2014/0257069 A1 | 9/2014 | Eliason et al. |
| 2014/0276712 A1 | 9/2014 | Mallin et al. |
| 2014/0276746 A1 | 9/2014 | Nabutovsky et al. |
| 2014/0288552 A1 | 9/2014 | Kunis |
| 2014/0309512 A1 | 10/2014 | Govari et al. |
| 2014/0309513 A1 | 10/2014 | Fish et al. |
| 2014/0350551 A1 | 11/2014 | Raatikka et al. |
| 2015/0011991 A1 | 1/2015 | Buysman et al. |
| 2015/0045863 A1 | 2/2015 | Litscher et al. |
| 2015/0080693 A1 | 3/2015 | Solis |
| 2015/0105770 A1 | 4/2015 | Amit |
| 2015/0119878 A1 | 4/2015 | Heisel et al. |
| 2015/0133919 A1 | 5/2015 | McDaniel et al. |
| 2015/0208942 A1 | 7/2015 | Bar-Tal et al. |
| 2015/0223757 A1 | 8/2015 | Werneth et al. |
| 2015/0250424 A1 | 9/2015 | Govari et al. |
| 2015/0270634 A1 | 9/2015 | Buesseler et al. |
| 2015/0282859 A1 | 10/2015 | Bencn et al. |
| 2015/0342491 A1 | 12/2015 | Marecki et al. |
| 2015/0342532 A1 | 12/2015 | Basu et al. |
| 2015/0351625 A1 | 12/2015 | Schroth et al. |
| 2015/0366508 A1 | 12/2015 | Chou et al. |
| 2016/0081746 A1 | 3/2016 | Solis |
| 2016/0113582 A1 | 4/2016 | Altmann et al. |
| 2016/0113709 A1 | 4/2016 | Maor |
| 2016/0183877 A1 | 6/2016 | Williams et al. |
| 2016/0228023 A1 | 8/2016 | Govari |
| 2016/0228062 A1 | 8/2016 | Altmann et al. |
| 2016/0278853 A1 | 9/2016 | Ogle et al. |
| 2016/0302858 A1 | 10/2016 | Bencini |
| 2016/0324573 A1 | 11/2016 | Mickelson et al. |
| 2016/0338770 A1 | 11/2016 | Bar-Tal et al. |
| 2017/0027638 A1 | 2/2017 | Solis |
| 2017/0035496 A1 | 2/2017 | Nagale et al. |
| 2017/0065227 A1 | 3/2017 | Marrs et al. |
| 2017/0071543 A1 | 3/2017 | Basu et al. |
| 2017/0071544 A1 | 3/2017 | Basu et al. |
| 2017/0071665 A1 | 3/2017 | Solis |
| 2017/0095173 A1 | 4/2017 | Bar-Tal et al. |

(56) References Cited

U.S. PATENT DOCUMENTS

| | | |
|---|---|---|
| 2017/0100187 A1 | 4/2017 | Basu et al. |
| 2017/0143227 A1 | 5/2017 | Marecki et al. |
| 2017/0156790 A1 | 6/2017 | Aujla |
| 2017/0164858 A1 | 6/2017 | Basu |
| 2017/0172442 A1 | 6/2017 | Govari |
| 2017/0172651 A1 | 6/2017 | Gross et al. |
| 2017/0185702 A1 | 6/2017 | Auerbach et al. |
| 2017/0202515 A1 | 7/2017 | Zrihem et al. |
| 2017/0221262 A1 | 8/2017 | Laughner et al. |
| 2017/0224958 A1 | 8/2017 | Cummings et al. |
| 2017/0265812 A1 | 9/2017 | Williams et al. |
| 2017/0281031 A1 | 10/2017 | Houben et al. |
| 2017/0281268 A1 | 10/2017 | Tran et al. |
| 2017/0296125 A1 | 10/2017 | Altmann et al. |
| 2017/0296251 A1 | 10/2017 | Wu et al. |
| 2017/0319140 A1 | 11/2017 | Wu et al. |
| 2017/0347959 A1 | 12/2017 | Guta et al. |
| 2017/0354338 A1 | 12/2017 | Levin et al. |
| 2017/0354339 A1 | 12/2017 | Zeidan et al. |
| 2017/0354364 A1 | 12/2017 | Bar-Tal et al. |
| 2018/0000540 A1 | 1/2018 | Ogle et al. |
| 2018/0008203 A1 | 1/2018 | Iyun et al. |
| 2018/0028084 A1 | 2/2018 | Williams et al. |
| 2018/0049803 A1 | 2/2018 | Solis |
| 2018/0085064 A1 | 3/2018 | Auerbach et al. |
| 2018/0116595 A1* | 5/2018 | Ruppersberg ........ A61B 5/287 |
| 2018/0132749 A1 | 5/2018 | Govari et al. |
| 2018/0137687 A1 | 5/2018 | Katz et al. |
| 2018/0160936 A1 | 6/2018 | Govari et al. |
| 2018/0160978 A1 | 6/2018 | Cohen et al. |
| 2018/0168511 A1 | 6/2018 | Hall et al. |
| 2018/0184982 A1 | 7/2018 | Basu et al. |
| 2018/0192958 A1 | 7/2018 | Wu |
| 2018/0192959 A1 | 7/2018 | Mou et al. |
| 2018/0206792 A1 | 7/2018 | Auerbach et al. |
| 2018/0228439 A1 | 8/2018 | Wu et al. |
| 2018/0235692 A1 | 8/2018 | Efimov et al. |
| 2018/0249959 A1 | 9/2018 | Osypka |
| 2018/0256109 A1 | 9/2018 | Wu et al. |
| 2018/0279954 A1 | 10/2018 | Hayam et al. |
| 2018/0303414 A1 | 10/2018 | Toth et al. |
| 2018/0303546 A1* | 10/2018 | Buysman ........ A61B 18/1492 |
| 2018/0310987 A1 | 11/2018 | Altmann et al. |
| 2018/0311497 A1 | 11/2018 | Viswanathan et al. |
| 2018/0338722 A1 | 11/2018 | Altmann et al. |
| 2018/0344188 A1 | 12/2018 | Govari |
| 2018/0344202 A1 | 12/2018 | Bar-Tal et al. |
| 2018/0344251 A1 | 12/2018 | Harlev et al. |
| 2018/0344393 A1 | 12/2018 | Gruba et al. |
| 2018/0360534 A1 | 12/2018 | Teplitsky et al. |
| 2018/0365355 A1 | 12/2018 | Auerbach et al. |
| 2019/0000540 A1 | 1/2019 | Cohen et al. |
| 2019/0008582 A1 | 1/2019 | Govari et al. |
| 2019/0015007 A1 | 1/2019 | Rottmann et al. |
| 2019/0030328 A1 | 1/2019 | Stewart et al. |
| 2019/0053708 A1 | 2/2019 | Gliner |
| 2019/0059766 A1 | 2/2019 | Houben et al. |
| 2019/0069950 A1 | 3/2019 | Viswanathan et al. |
| 2019/0069954 A1 | 3/2019 | Cohen et al. |
| 2019/0117111 A1 | 4/2019 | Osadchy et al. |
| 2019/0117303 A1 | 4/2019 | Claude et al. |
| 2019/0117315 A1 | 4/2019 | Keyes et al. |
| 2019/0125338 A1 | 5/2019 | Shelton, IV et al. |
| 2019/0125437 A1 | 5/2019 | Govari et al. |
| 2019/0125439 A1 | 5/2019 | Rohl et al. |
| 2019/0133552 A1 | 5/2019 | Shemesh et al. |
| 2019/0142293 A1 | 5/2019 | Solis |
| 2019/0164633 A1 | 5/2019 | Ingel et al. |
| 2019/0167137 A1 | 6/2019 | Bar-Tal et al. |
| 2019/0167140 A1 | 6/2019 | Williams et al. |
| 2019/0188909 A1 | 6/2019 | Yellin et al. |
| 2019/0201664 A1 | 7/2019 | Govari |
| 2019/0209089 A1 | 7/2019 | Baram et al. |
| 2019/0216346 A1 | 7/2019 | Ghodrati et al. |
| 2019/0216347 A1 | 7/2019 | Ghodrati et al. |
| 2019/0231421 A1 | 8/2019 | Viswanathan et al. |
| 2019/0231423 A1 | 8/2019 | Weinkam et al. |
| 2019/0239811 A1 | 8/2019 | Just et al. |
| 2019/0246935 A1 | 8/2019 | Govari et al. |
| 2019/0298442 A1 | 10/2019 | Ogata et al. |
| 2019/0314083 A1 | 10/2019 | Herrera et al. |
| 2019/0328260 A1 | 10/2019 | Zeidan et al. |
| 2019/0336210 A1 | 11/2019 | Beeckler et al. |
| 2019/0343580 A1 | 11/2019 | Nguyen et al. |
| 2019/0350567 A1 | 11/2019 | Cummins et al. |
| 2020/0000518 A1 | 1/2020 | Kiernan et al. |
| 2020/0008705 A1 | 1/2020 | Ziv-Ari et al. |
| 2020/0008869 A1 | 1/2020 | Byrd |
| 2020/0009378 A1 | 1/2020 | Stewart et al. |
| 2020/0015890 A1 | 1/2020 | To et al. |
| 2020/0022653 A1 | 1/2020 | Moisa |
| 2020/0029845 A1 | 1/2020 | Baram et al. |
| 2020/0046421 A1 | 2/2020 | Govari |
| 2020/0046423 A1 | 2/2020 | Viswanathan et al. |
| 2020/0060569 A1 | 2/2020 | Tegg |
| 2020/0077959 A1 | 3/2020 | Altmann et al. |
| 2020/0093539 A1 | 3/2020 | Long et al. |
| 2020/0129089 A1 | 4/2020 | Gliner et al. |
| 2020/0129125 A1 | 4/2020 | Govari et al. |
| 2020/0129128 A1 | 4/2020 | Gliner et al. |
| 2020/0179650 A1 | 6/2020 | Beeckler et al. |
| 2020/0196896 A1 | 6/2020 | Solis |
| 2020/0205689 A1 | 7/2020 | Squires et al. |
| 2020/0205690 A1 | 7/2020 | Williams et al. |
| 2020/0205737 A1 | 7/2020 | Beeckler |
| 2020/0205876 A1 | 7/2020 | Govari |
| 2020/0205892 A1 | 7/2020 | Viswanathan et al. |
| 2020/0206461 A1 | 7/2020 | Govari et al. |
| 2020/0206498 A1 | 7/2020 | Arora et al. |
| 2020/0289197 A1 | 9/2020 | Viswanathan et al. |
| 2020/0297234 A1 | 9/2020 | Houben et al. |
| 2020/0297281 A1 | 9/2020 | Basu et al. |
| 2020/0305726 A1 | 10/2020 | Salvestro et al. |
| 2020/0305946 A1 | 10/2020 | DeSimone et al. |
| 2020/0375657 A1 | 12/2020 | Olson et al. |
| 2020/0397328 A1 | 12/2020 | Altmann et al. |
| 2020/0398048 A1 | 12/2020 | Krimsky et al. |
| 2021/0015549 A1 | 1/2021 | Haghighi-Mood et al. |
| 2021/0022684 A1 | 1/2021 | Govari et al. |
| 2021/0045805 A1 | 2/2021 | Govari et al. |
| 2021/0059549 A1 | 3/2021 | Urman et al. |
| 2021/0059550 A1 | 3/2021 | Urman et al. |
| 2021/0059608 A1 | 3/2021 | Beeckler et al. |
| 2021/0059743 A1 | 3/2021 | Govari |
| 2021/0059747 A1 | 3/2021 | Krans et al. |
| 2021/0077184 A1 | 3/2021 | Basu et al. |
| 2021/0082157 A1 | 3/2021 | Rosenberg et al. |
| 2021/0085200 A1 | 3/2021 | Auerbach et al. |
| 2021/0085204 A1 | 3/2021 | Auerbach et al. |
| 2021/0085215 A1 | 3/2021 | Auerbach et al. |
| 2021/0085387 A1 | 3/2021 | Amit et al. |
| 2021/0093292 A1 | 4/2021 | Baram et al. |
| 2021/0093294 A1 | 4/2021 | Shemesh et al. |
| 2021/0093374 A1 | 4/2021 | Govari et al. |
| 2021/0093377 A1 | 4/2021 | Herrera et al. |
| 2021/0100612 A1 | 4/2021 | Baron et al. |
| 2021/0113822 A1 | 4/2021 | Beeckler et al. |
| 2021/0127999 A1 | 5/2021 | Govari et al. |
| 2021/0128010 A1 | 5/2021 | Govari et al. |
| 2021/0133516 A1 | 5/2021 | Govari et al. |
| 2021/0145282 A1 | 5/2021 | Bar-Tal et al. |
| 2021/0161582 A1 | 6/2021 | Byrd et al. |
| 2021/0161592 A1 | 6/2021 | Altmann et al. |
| 2021/0162210 A1 | 6/2021 | Altmann et al. |
| 2021/0169421 A1 | 6/2021 | Govari |
| 2021/0169550 A1 | 6/2021 | Govari et al. |
| 2021/0169567 A1 | 6/2021 | Govari et al. |
| 2021/0169568 A1 | 6/2021 | Govari et al. |
| 2021/0177294 A1 | 6/2021 | Gliner et al. |
| 2021/0177356 A1 | 6/2021 | Gliner et al. |
| 2021/0177503 A1 | 6/2021 | Altmann et al. |
| 2021/0178166 A1 | 6/2021 | Govari et al. |
| 2021/0186363 A1 | 6/2021 | Gliner et al. |
| 2021/0186604 A1 | 6/2021 | Altmann et al. |

(56) References Cited

U.S. PATENT DOCUMENTS

| | | |
|---|---|---|
| 2021/0187241 A1 | 6/2021 | Govari et al. |
| 2021/0187254 A1 | 6/2021 | Beeckler et al. |
| 2021/0196372 A1 | 7/2021 | Altmann et al. |
| 2021/0196394 A1 | 7/2021 | Govari et al. |
| 2021/0212591 A1 | 7/2021 | Govari et al. |
| 2021/0219904 A1 | 7/2021 | Yarnitsky et al. |
| 2021/0236815 A1 | 8/2021 | Waldstreicher et al. |
| 2021/0278936 A1 | 9/2021 | Katz et al. |
| 2021/0282659 A1 | 9/2021 | Govari et al. |
| 2021/0307815 A1 | 10/2021 | Govari et al. |
| 2021/0308424 A1 | 10/2021 | Beeckler et al. |
| 2021/0338319 A1 | 11/2021 | Govari et al. |
| 2021/0369339 A1 | 12/2021 | Salazar et al. |
| 2022/0071695 A1 | 3/2022 | Beeckler et al. |
| 2022/0071696 A1 | 3/2022 | Beeckler et al. |
| 2022/0110679 A1 | 4/2022 | Wang et al. |
| 2022/0304745 A1 | 9/2022 | Olson |
| 2022/0387051 A1 | 12/2022 | Girdhar |
| 2023/0000550 A1* | 1/2023 | Nedved ............... A61B 18/1492 |
| 2023/0130692 A1 | 4/2023 | Wang et al. |
| 2023/0225790 A1 | 7/2023 | Okarski |
| 2023/0346455 A1 | 11/2023 | Beeckler et al. |
| 2023/0346459 A1 | 11/2023 | Beeckler et al. |
| 2023/0346462 A1 | 11/2023 | Beeckler et al. |
| 2023/0346464 A1 | 11/2023 | Beeckler et al. |
| 2024/0216045 A1 | 7/2024 | Keyes |
| 2025/0057589 A1* | 2/2025 | Sandquist ............... A61N 1/0551 |

FOREIGN PATENT DOCUMENTS

| | | |
|---|---|---|
| CN | 111248996 A | 6/2020 |
| EP | 0668740 A1 | 8/1995 |
| EP | 0644738 B1 | 3/2000 |
| EP | 0727183 B1 | 11/2002 |
| EP | 0727184 B1 | 12/2002 |
| EP | 2201905 A1 | 6/2010 |
| EP | 2783651 A1 | 10/2014 |
| EP | 2699151 B1 | 11/2015 |
| EP | 2699152 B1 | 11/2015 |
| EP | 2699153 B1 | 12/2015 |
| EP | 2498706 B1 | 4/2016 |
| EP | 2578173 B1 | 6/2017 |
| EP | 3181082 A1 | 6/2017 |
| EP | 3238645 A1 | 11/2017 |
| EP | 2884931 B1 | 1/2018 |
| EP | 3315086 A1 | 5/2018 |
| EP | 2349440 B1 | 8/2019 |
| EP | 3318211 B1 | 12/2019 |
| EP | 3581135 A1 | 12/2019 |
| EP | 2736434 B1 | 2/2020 |
| EP | 3451962 B1 | 3/2020 |
| EP | 3791816 A2 | 3/2021 |
| EP | 3972510 A1 | 3/2022 |
| EP | 4115834 A1 | 1/2023 |
| WO | 9421167 A1 | 9/1994 |
| WO | 9421169 A1 | 9/1994 |
| WO | 9625095 A1 | 8/1996 |
| WO | 9634560 A1 | 11/1996 |
| WO | 0182814 B1 | 5/2002 |
| WO | 2004087249 A2 | 10/2004 |
| WO | 2012100185 A2 | 7/2012 |
| WO | 2013052852 A1 | 4/2013 |
| WO | 2013162884 A1 | 10/2013 |
| WO | 2013173917 A1 | 11/2013 |
| WO | 2013176881 A1 | 11/2013 |
| WO | 2014176205 A1 | 10/2014 |
| WO | 2016019760 A1 | 2/2016 |
| WO | 2016044687 A1 | 3/2016 |
| WO | 2018111600 A1 | 6/2018 |
| WO | 2018191149 A1 | 10/2018 |
| WO | 2019084442 A1 | 5/2019 |
| WO | 2019143960 A1 | 7/2019 |
| WO | 2020026217 A1 | 2/2020 |
| WO | 2020194216 A1 | 10/2020 |
| WO | 2020206328 A1 | 10/2020 |
| WO | 2022001908 A1 | 1/2022 |

OTHER PUBLICATIONS

Extended European Search Report dated Feb. 2, 2023, from Corresponding European Application No. 22194819.3, 8 pages.
Extended European Search Report and Opinion dated Jun. 1, 2023, from corresponding European Application No. 23152493.5.
Extended European Search Report and Opinion dated Jun. 7, 2023, from corresponding European Application No. 23152399.4.
Extended European Search Report and Opinion dated Jun. 12, 2023, from corresponding European Application No. 23152448.9.
Extended European Search Report dated Jun. 13, 2023, from Corresponding European Application No. 23152458.8, 12 pages.
Extended European Search Report and Opinion dated Sep. 6, 2023, from corresponding European Application No. 23152472.9.
Extended European Search Report & Search Opinion dated Sep. 19, 2023, from corresponding European Application No. 23170233.3.
Extended European Search Report & Search Opinion dated Sep. 19, 2023, from corresponding European Application No. 23170325.7.
Extended European Search Report & Search Opinion dated Sep. 21, 2023, from corresponding European Application No. 23170230.9.
Extended European Search Report & Search Opinion dated Sep. 21, 2023, from corresponding European Application No. 23170409.9.
Extended European Search Report & Search Opinion dated Jan. 2, 2024, from corresponding European Application No. 23170297.8.

* cited by examiner

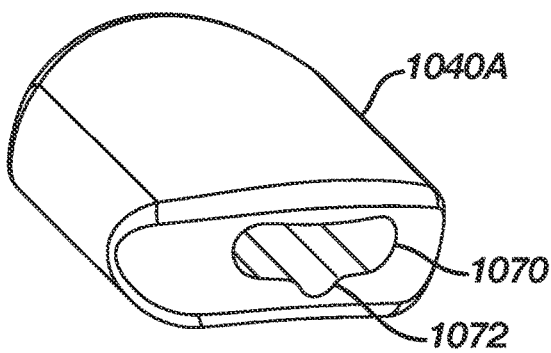
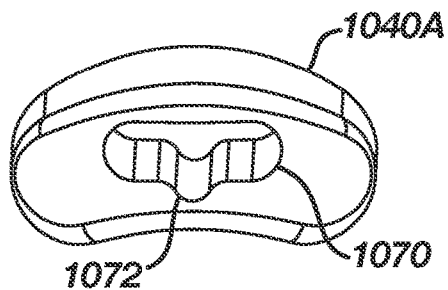
FIG. 10A    FIG. 10B
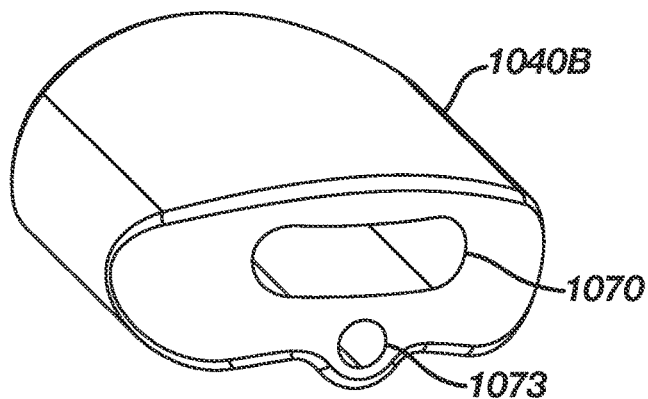
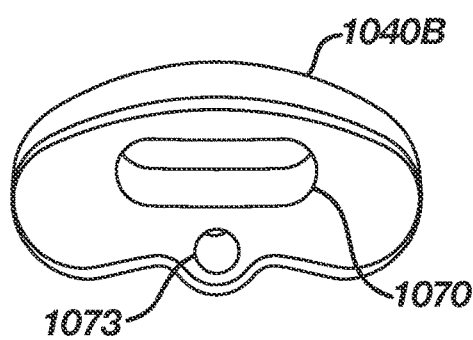
FIG. 10C    FIG. 10D
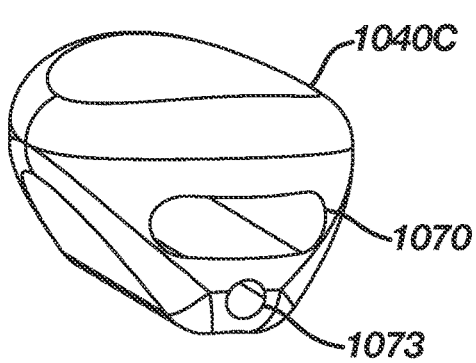
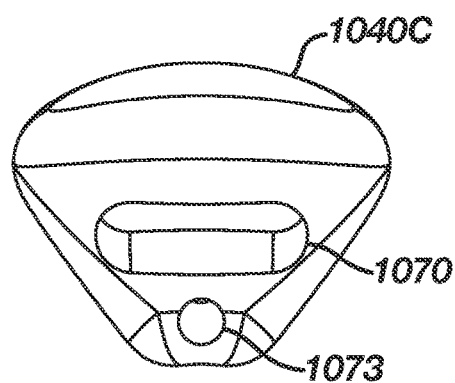
FIG. 10E    FIG. 10F

MECHANICAL RETAINER SYSTEMS FOR ELECTRODES OF A BASKET CATHETER, AND METHODS OF THE SAME

CROSS REFERENCE TO RELATED APPLICATIONS

This application claims the benefit of priority under 35 U.S.C. § 119 to prior filed U.S. Provisional Patent Application No. 63/301,142 filed on Jan. 20, 2022, the entire contents of which is hereby incorporated by reference as if set forth in full herein.

FIELD

The present invention relates generally to medical devices, and in particular catheters with electrodes, and further relates to, but not exclusively, catheters suitable for use to induce irreversible electroporation (IRE) of cardiac tissues.

BACKGROUND

Cardiac arrhythmias, such as atrial fibrillation (AF), occur when regions of cardiac tissue abnormally conduct electric signals to adjacent tissue. This disrupts the normal cardiac cycle and causes asynchronous rhythm. Certain procedures exist for treating arrhythmia, including surgically disrupting the origin of the signals causing the arrhythmia and disrupting the conducting pathway for such signals. By selectively ablating cardiac tissue by application of energy via a catheter, it is sometimes possible to cease or modify the propagation of unwanted electrical signals from one portion of the heart to another.

Many current ablation approaches in the art utilize radiofrequency (RF) electrical energy to heat tissue. RF ablation can have certain risks related to thermal heating which can lead to tissue charring, burning, steam pop, phrenic nerve palsy, pulmonary vein stenosis, and esophageal fistula.

Cryoablation is an alternative approach to RF ablation that generally reduces thermal risks associated with RF ablation. Maneuvering cryoablation devices and selectively applying cryoablation, however, is generally more challenging compared to RF ablation; therefore cryoablation is not viable in certain anatomical geometries which may be reached by electrical ablation devices.

Some ablation approaches use irreversible electroporation (IRE) to ablate cardiac tissue using nonthermal ablation methods. IRE delivers short pulses of high voltage to tissues and generates an unrecoverable permeabilization of cell membranes. Delivery of IRE energy to tissues using multi-electrode catheters was previously proposed in the patent literature. Examples of systems and devices configured for IRE ablation are disclosed in U.S. Patent Pub. No. 2021/0169550A1, 2021/0169567A1, 2021/0169568A1, 2021/0161592A1, 2021/0196372A1, 2021/0177503A1, and 2021/0186604A1, each of which are incorporated by reference in their entirety into this application as if set forth in full and attached in the appendix to priority application U.S. 63/301,142.

Regions of cardiac tissue can be mapped by a catheter to identify the abnormal electrical signals. The same or different catheter can be used to perform ablation. Some example catheters include a number of spines with electrodes positioned thereon. The electrodes are generally attached to the spines and secured in place by soldering, welding, or using an adhesive. Due to the small size of the spines and the electrodes, however, soldering, welding, or adhering the electrodes to the spines can be a difficult task, increasing the manufacturing time and cost and the chances that the electrode fails due to an improper bond or misalignment. What is needed, therefore, are systems and methods of attaching an electrode to a spine of a basket assembly without the need for soldering, welding, or using adhesive.

SUMMARY

There is provided, in accordance with an embodiment of the present invention, a medical probe, including a plurality of spines having electrodes disposed thereon. The spines of the medical probe each include a strut having a mechanical retainer and the electrodes each includes a lumen therethrough. The strut can be inserted into the lumen of the electrode and the mechanical retainer of the strut can engage with the electrode and prevent the electrode from sliding proximally or distally along a length of the spine. In this way, the presently disclosed technology can be used to secure the electrodes to the spines without requiring solder, weld, or adhesives.

The disclosed technology includes a medical probe including a tubular shaft having a proximal end and a distal end and an expandable basket assembly coupled to the distal end of the tubular shaft. The tubular shaft can extend along a longitudinal axis.

The expandable basket assembly can include a plurality of electrodes. Each electrode can include a lumen therethrough. The expandable basket assembly can further include a plurality of spines extending along the longitudinal axis and configured to bow radially outward from the longitudinal axis when the expandable basket assembly is transitioned from a collapsed form to an expanded form.

Each spine of the plurality of spines can include a proximal end, a distal end, and a strut passing through the lumen of an electrode of the plurality of electrodes. The strut can include a mechanical retainer disposed on the strut that can prevent the electrode from sliding proximally or distally along a length of the spine.

The mechanical retainer of the strut can include one or more protrusions extending outwardly from the strut to form a lip that prevents the electrode from sliding proximally or distally along the length of the spine. The strut can include a first and a second strut each including a respective protrusion of the one or more protrusions. The first and second struts can be configured to be compressible toward each other to allow the respective protrusions to slide through the lumen of the electrode. The first and second struts each can include a respective pair of protrusions of the one or more protrusions. Each pair of protrusions can include a first protrusion positioned on a first side of the electrode and a second protrusion positioned on a second side of the electrode such that each pair of protrusions prevent the electrode from sliding proximally or distally along the length of the spine.

The mechanical retainer of the strut can include a bend forming a spring bias in the strut to cause the strut to form a friction fit with the electrode and prevent the electrode from sliding proximally or distally along the length of the spine. The bend can extend from proximate a first end of the electrode to proximate a second end of the electrode to cause the strut to form a friction fit at a first portion and a second portion of an inner surface of the electrode. Alternatively, the bend can extend from a first distance beyond a first end of the electrode to a second distance beyond a second end of the electrode to cause the strut to form a friction fit at an inner surface of the electrode and an outer edge of the electrode.

The strut can include a first and a second strut each including a respective protrusion. The first and second struts can be configured to be compressible toward each other to allow the respective protrusions to slide through the lumen of the electrode. The first and second struts can further include a bend.

The strut can include a first strut, a second strut, and a third strut positioned between the first and second struts. The first and second struts can each include a respective protrusion and be compressible toward each other to allow the respective protrusions to slide through the lumen of the electrode and third strut can include the bend.

The spine of the plurality of spines can include a first electrode and a second electrode and the strut can include a first mechanical retainer configured to engage with the first electrode and a second mechanical retainer configured to engage with the second electrode. The first and second mechanical retainers can be configured to prevent the first and second electrodes from sliding proximally or distally along a length of the spine when the first and second mechanical retainers are engaged with the first and second electrodes, respectively.

The mechanical retainer(s) of the strut can include an interference fitting.

The medical probe can further include a wire and the lumen can include a relief configured to receive the wire of the medical probe. The wire can be insulated from the strut and electrically connected to the electrode. At least a portion of the wire can include an electrically conductive core material having a first electrical conductivity, an electrically conductive cover material having a second electrical conductivity less than the first electrical conductivity. The electrically conductive cover material can circumscribe the electrically conductive core material. The wire can also include an insulative jacket circumscribing the electrically conductive cover material. At least a portion of the wire can include a plurality of strands and an insulative jacket circumscribing the plurality of strands. Each strand of the plurality of strands can include an electrically conductive core material having a first electrical conductivity and an electrically conductive cover material having a second electrical conductivity less than the first electrical conductivity. The electrically conductive cover material can circumscribe the electrically conductive core material.

The strut can include a material selected from a group consisting of nitinol, cobalt chromium, stainless steel, titanium. Alternatively, or in addition, the strut can include a polymer.

The electrode can include a ring type electrode, a bulging type electrode, or a rectangular electrode. The plurality of electrodes can be configured to deliver electrical pulses for irreversible electroporation, the pulses having a peak voltage of at least 900 volts (V).

The plurality of spines can be configured to form an approximately spherically-shaped basket assembly or an approximately oblate-spheroid basket assembly when in the expanded form.

The medical probe can further include spray ports that can be configured to deliver an irrigation fluid to the plurality of electrodes.

The medical probe can further include a plurality of electrically insulative jackets each disposed between a respective spine of the plurality of spines and a respective electrode of the plurality of electrodes, thereby electrically isolating the plurality of electrodes from the plurality of spines. Each of the electrically insulative jackets of the plurality of electrically insulative jackets can include a first lumen and a second lumen. The first lumen can be configured to receive a first wire and the second lumen can be configured to receive the respective spine. Furthermore, a cross-sectional shape of each electrically insulative jacket can include a substantially trapezoidal shape.

The disclosed technology can further include a method of constructing a medical probe. The method can include aligning a spine of an expandable basket assembly with an electrode of the expandable basket assembly. The spine can have a proximal end, a distal end, and a strut having a mechanical retainer. The method can further include inserting the spine into a lumen of the electrode and pushing the spine into the lumen of the electrode until the mechanical retainer engages with the electrode to prevent the electrode from sliding proximally or distally along a length of the spine.

The mechanical retainer of the strut can include one or more protrusions extending outwardly from the strut to form a lip. Furthermore, pushing the spine into the lumen of the electrode until the mechanical retainer engages with the electrode can include pushing the spine into the lumen of the electrode until the lip is positioned to prevent the electrode from sliding proximally or distally along the length of the spine.

The strut can include a first and a second strut each including a respective protrusion of the one or more protrusions. Pushing the spine into the lumen of the electrode until the mechanical retainer engages with the electrode can include pushing the spine into the lumen of the electrode to cause the first and second struts to compress toward each other to allow the respective protrusions to slide through the lumen of the electrode.

The first and second struts can each include a respective pair of protrusions of the one or more protrusions, each pair of protrusions including a first protrusion and a second protrusion. Furthermore, pushing the spine into the lumen of the electrode until the mechanical retainer engages with the electrode includes pushing the spine into the lumen of the electrode to cause the first protrusion to be positioned on a first side of the electrode and the second protrusion to be positioned on a second side of the electrode so that the pair of protrusions prevent the electrodes from sliding proximally or distally along the length of the spine.

The mechanical retainer of the strut can include a bend forming a spring bias in the strut. The spring bias can cause the strut to form a friction fit with the electrode and prevent the electrode from sliding along the length of the spine. Pushing the spine into the lumen of the electrode until the mechanical retainer engages with the electrode can include pushing the spine into the lumen of the electrode until the bend is positioned to prevent the electrode from sliding proximally or distally along the length of the spine.

The method can further include positioning the bend to extend from proximate a first end of the electrode to proximate a second end of the electrode to cause the strut to form a friction fit at a first portion and a second portion of an inner surface of the electrode.

The method can further include positioning the bend to extend from a first distance beyond a first end of the electrode to a second distance beyond a second end of the electrode to cause the strut to form a friction fit at an inner surface of the electrode and an outer edge of the electrode.

The spine can include a first electrode and a second electrode, and the mechanical retainer includes a first mechanical retainer and a second mechanical retainer. The method can further include aligning the spine of the expandable basket assembly with the first electrode and the second electrode, inserting the spine into a lumen of the first electrode and a lumen of the second electrode, pushing the spine into the lumen of the first electrode until the first mechanical retainer engages with the first electrode to prevent the first electrode from sliding proximally or distally along a length of the spine, and pushing the spine into the lumen of the second electrode until the second mechanical retainer engages with the second electrode to prevent the second electrode from sliding proximally or distally along a length of the spine.

The method can further include securing the mechanical retainer to the electrode by an interference fit.

The lumen can include a relief configured to receive a wire of the medical probe. The wire can be insulated from the strut and electrically connected to the electrode.

At least a portion of the wire can include an electrically conductive core material having a first electrical conductivity and an electrically conductive cover material having a second electrical conductivity less than the first electrical conductivity. The electrically conductive cover material can circumscribe the electrically conductive core material. The wire can further include an insulative jacket circumscribing the electrically conductive cover material.

At least a portion of the wire can include a plurality of strands and an insulative jacket circumscribing the plurality of the strands. Each strand of the plurality of strands respectively can include an electrically conductive core material having a first electrical conductivity and an electrically conductive cover material having a second electrical conductivity less than the first electrical conductivity. The electrically conductive cover material can circumscribe the electrically conductive core material.

The strut can include a material selected from a group consisting of nitinol, cobalt chromium, stainless steel, titanium. Alternatively, or in addition, the strut can include a polymer.

The electrode can include a ring type electrode, a bulging type electrode, or a rectangular electrode. The method can further include configuring the electrode to deliver electrical pulses for irreversible electroporation, the pulses having a peak voltage of at least 900 volts (V).

The method can further include configuring the plurality of spines to form an approximately spherically-shaped basket assembly or an oblate-spheroid-shaped basket assembly.

The method can further include configuring spray ports to deliver an irrigation fluid to the electrode.

The method can include positioning each spine of the plurality of spines through a first lumen of an electrically insulative jacket, positioning a wire through a second lumen of the electrically insulative jacket, positioning the electrode over the electrically insulative jacket, and electrically connecting the wire to the electrode through an aperture in the electrically insulative jacket providing passage between the second lumen and the electrode. A cross-sectional shape of the electrically insulative jacket can have a substantially trapezoidal shape.

BRIEF DESCRIPTION OF THE DRAWINGS

FIGS. 10A-10F are schematic pictorial illustrations showing various electrodes of a given medical device, in accordance with various embodiments of the present invention;

DETAILED DESCRIPTION

Figure 1:
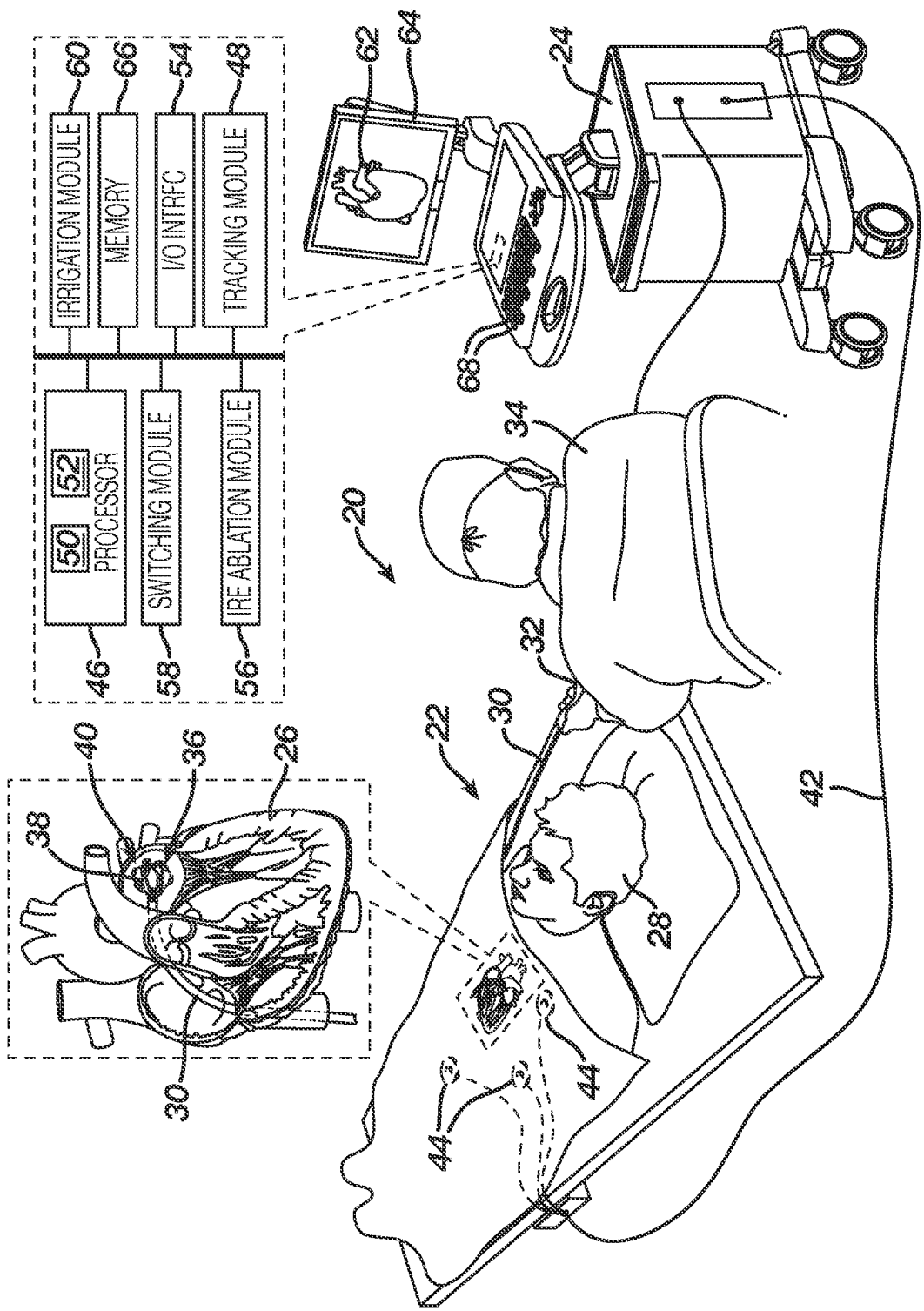
FIG. 1 is a schematic pictorial illustration of a medical system including a medical probe whose distal end includes a basket assembly with electrodes, in accordance with an embodiment of the present invention.

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g. "about 90%" may refer to the range of values from 71% to 110%. In addition, as used herein, the terms "patient," "host," "user," and "subject" refer to any human or animal subject and are not intended to limit the systems or methods to human use, although use of the subject invention in a human patient represents a preferred embodiment. As well, the term "proximal" indicates a location closer to the operator or physician whereas "distal" indicates a location further away to the operator or physician.

As discussed herein, vasculature of a "patient," "host," "user," and "subject" can be vasculature of a human or any animal. It should be appreciated that an animal can be a variety of any applicable type, including, but not limited thereto, mammal, veterinarian animal, livestock animal or pet type animal, etc. As an example, the animal can be a laboratory animal specifically selected to have certain characteristics similar to a human (e.g., rat, dog, pig, monkey, or the like). It should be appreciated that the subject can be any applicable human patient, for example.

As discussed herein, "operator" can include a doctor, surgeon, technician, scientist, or any other individual or delivery instrumentation associated with delivery of a multi-electrode catheter for the treatment of drug refractory atrial fibrillation to a subject.

As discussed herein, the term "ablate" or "ablation", as it relates to the devices and corresponding systems of this disclosure, refers to components and structural features configured to reduce or prevent the generation of erratic cardiac signals in the cells by utilizing non-thermal energy, such as irreversible electroporation (IRE), referred throughout this disclosure interchangeably as pulsed electric field (PEF) and pulsed field ablation (PFA). Ablating or ablation as it relates to the devices and corresponding systems of this disclosure is used throughout this disclosure in reference to non-thermal ablation of cardiac tissue for certain conditions including, but not limited to, arrhythmias, atrial flutter ablation, pulmonary vein isolation, supraventricular tachycardia ablation, and ventricular tachycardia ablation. The term "ablate" or "ablation" also includes known methods, devices, and systems to achieve various forms of bodily tissue ablation as understood by a person skilled in the relevant art.

As discussed herein, the terms "bipolar" and "unipolar" when used to refer to ablation schemes describe ablation schemes which differ with respect to electrical current path and electric field distribution. "Bipolar" refers to ablation scheme utilizing a current path between two electrodes that are both positioned at a treatment site; current density and electric flux density is typically approximately equal at each of the two electrodes. "Unipolar" refers to ablation scheme utilizing a current path between two electrodes where one electrode having a high current density and high electric flux density is positioned at a treatment site, and a second electrode having comparatively lower current density and lower electric flux density is positioned remotely from the treatment site.

As discussed herein, the terms "biphasic pulse" and "monophasic pulse" refer to respective electrical signals. "Biphasic pulse" refers to an electrical signal having a positive-voltage phase pulse (referred to herein as "positive phase") and a negative-voltage phase pulse (referred to herein as "negative phase"). "Monophasic pulse" refers to an electrical signal having only a positive or only a negative phase. Preferably, a system providing the biphasic pulse is configured to prevent application of a direct current voltage (DC) to a patient. For instance, the average voltage of the biphasic pulse can be zero volts with respect to ground or other common reference voltage. Additionally, or alternatively, the system can include a capacitor or other protective component. Where voltage amplitude of the biphasic and/or monophasic pulse is described herein, it is understood that the expressed voltage amplitude is an absolute value of the approximate peak amplitude of each of the positive-voltage phase and/or the negative-voltage phase. Each phase of the biphasic and monophasic pulse preferably has a square shape having an essentially constant voltage amplitude during a majority of the phase duration. Phases of the biphasic pulse are separated in time by an interphase delay. The interphase delay duration is preferably less than or approximately equal to the duration of a phase of the biphasic pulse. The interphase delay duration is more preferably about 25% of the duration of the phase of the biphasic pulse.

As discussed herein, the terms "tubular" and "tube" are to be construed broadly and are not limited to a structure that is a right cylinder or strictly circumferential in cross-section or of a uniform cross-section throughout its length. For example, the tubular structures are generally illustrated as a substantially right cylindrical structure. However, the tubular structures may have a tapered or curved outer surface without departing from the scope of the present disclosure.

The term "temperature rating", as used herein, is defined as the maximum continuous temperature that a component can withstand during its lifetime without causing thermal damage, such as melting or thermal degradation (e.g., charring and crumbling) of the component.

The present disclosure is related to systems, method or uses and devices for IRE ablation of cardiac tissue to treat cardiac arrhythmias. Ablative energies are typically provided to cardiac tissue by a tip portion of a catheter which can deliver ablative energy alongside the tissue to be ablated. Some example catheters include three-dimensional structures at the tip portion and are configured to administer ablative energy from various electrodes positioned on the three-dimensional structures. Ablative procedures incorporating such example catheters can be visualized using fluoroscopy.

Ablation of cardiac tissue using application of a thermal technique, such as radio frequency (RF) energy and cryoablation, to correct a malfunctioning heart is a well-known procedure. Typically, to successfully ablate using a thermal technique, cardiac electropotentials need to be measured at various locations of the myocardium. In addition, temperature measurements during ablation provide data enabling the efficacy of the ablation. Typically, for an ablation procedure using a thermal technique, the electropotentials and the temperatures are measured before, during, and after the actual ablation. RF approaches can have risks that can lead to tissue charring, burning, steam pop, phrenic nerve palsy, pulmonary vein stenosis, and esophageal fistula. Cryoablation is an alternative approach to RF ablation that can reduce some thermal risks associated with RF ablation. However maneuvering cryoablation devices and selectively applying cryoablation is generally more challenging compared to RF ablation; therefore cryoablation is not viable in certain anatomical geometries which may be reached by electrical ablation devices.

While RF ablation and cryoablation, are based on thermal energy transfer to induce local tissue necrosis, the solution of this disclosure resolves these and other problems by utilizing irreversible electroporation (IRE), referred throughout this disclosure interchangeably as pulsed electric field (PEF) ablation and pulsed field ablation (PFA). IRE as discussed in this disclosure is a non-thermal cell death technology that can be used for ablation of atrial arrhythmias. To ablate using IRE/PEF, biphasic voltage pulses are applied to disrupt cellular structures of myocardium. The biphasic pulses are non-sinusoidal and can be tuned to target cells based on electrophysiology of the cells. In contrast, to ablate using RF, a sinusoidal voltage waveform is applied to produce heat at the treatment area, indiscriminately heating all cells in the treatment area. IRE therefore has the capability to spare adjacent heat sensitive structures or tissues which would be of benefit in the reduction of possible complications known with ablation or isolation modalities. Additionally, or alternatively, monophasic pulses can be utilized.

Electroporation can be induced by applying a pulsed electric field across biological cells to cause reversable (temporary) or irreversible (permanent) creation of pores in the cell membrane. The cells have a transmembrane electrostatic potential that is increased above a resting potential upon application of the pulsed electric field. While the transmembrane electrostatic potential remains below a threshold potential, the electroporation is reversable, meaning the pores can close when the applied pulse electric field is removed, and the cells can self-repair and survive. If the transmembrane electrostatic potential increases beyond the threshold potential, the electroporation is irreversible, and the cells become permanently permeable. As a result, the cells die due to a loss of homeostasis and typically die by apoptosis. Generally, cells of differing types have differing threshold potential. For instance, heart cells have a threshold potential of approximately 500 V/cm, whereas for bone it is 3000 V/cm. These differences in threshold potential allow IRE to selectively target tissue based on threshold potential.

The solution of this disclosure includes systems and methods for applying electrical signals from catheter electrodes positioned in the vicinity of myocardial tissue to generate a pulsed electric field effective to induce electroporation in the myocardial tissue. The systems and methods can be effective to ablate targeted tissue by inducing irreversible electroporation. In some examples, the systems and methods can be effective to induce reversible electroporation as part of a diagnostic procedure. Reversible electroporation occurs when the electricity applied with the electrodes is below the electric field threshold of the target tissue allowing cells to repair. Reversible electroporation does not kill the cells but allows a physician to see the effect of reversible electroporation on electrical activation signals in the vicinity of the target location. Example systems and methods for reversible electroporation is disclosed in U.S. Patent Publication 2021/0162210, the entirety of which is incorporated by reference in its entirety into this application as if set forth in full and attached in the appendix to priority application U.S. 63/301,142.

The pulsed electric field, and its effectiveness to induce reversible and/or irreversible electroporation, can be affected by physical parameters of the system and biphasic pulse parameters of the electrical signal. Physical parameters can include electrode contact area, electrode spacing, electrode geometry, etc. examples presented herein generally include physical parameters adapted to effectively induce reversible and/or irreversible electroporation. Biphasic pulse parameters of the electrical signal can include voltage amplitude, pulse duration, pulse interphase delay, inter-pulse delay, total application time, delivered energy, etc. In some examples, parameters of the electrical signal can be adjusted to induce both reversible and irreversible electroporation given the same physical parameters. Examples of various systems and methods of ablation including IRE are presented in U.S. Patent Publications 2021/0169550A1, 2021/0169567A1, 2021/0169568A1, 2021/0161592A1, 2021/0196372A1, 2021/0177503A1, and 2021/0186604A1, the entireties of each of which are incorporated by reference in their entirety into this application as if set forth in full and attached in the appendix to priority application U.S. 63/301,142.

To deliver pulsed field ablation (PFA) in an IRE (irreversible electroporation) procedure, electrodes should contact the tissue being ablated with a sufficiently large surface area. As described hereinbelow, the medical probe includes a flexible tubular shaft having proximal and distal ends, and a basket assembly at the distal end of the flexible tubular shaft. The basket assembly includes at least one spine and a plurality of electrodes, each given electrode having a lumen therethrough fitting a given spine.

FIG. 1 is a schematic, pictorial illustration of a medical system 20 including a medical probe 22 and a control console 24, in accordance with an embodiment of the present invention. Medical system 20 may be based, for example, on the CARTO® system, produced by Biosense Webster Inc. of 31 Technology Drive, Suite 200, Irvine, CA 92618 USA. In embodiments described hereinbelow, medical probe 22 can be used for diagnostic or therapeutic treatment, such as for performing ablation procedures in a heart 26 of a patient 28. Alternatively, medical probe 22 may be used, mutatis mutandis, for other therapeutic and/or diagnostic purposes in the heart or in other body organs.

Medical probe 22 includes a flexible tubular shaft 30 and a handle 32 coupled to a proximal end of the tubular shaft. During a medical procedure, a medical professional 34 can insert probe 22 through the vascular system of patient 28 so that a distal end 36 of the medical probe enters a body cavity such as a chamber of heart 26. Upon distal end 36 entering the chamber of heart 26, medical professional 34 can deploy a basket assembly 38 affixed to distal end 36. Basket assembly 38 can include a plurality of electrodes 40 affixed to a plurality of spines, as described in the description referencing FIGS. 2A and 2B hereinbelow. To start performing a medical procedure such as irreversible electroporation (IRE) ablation, medical professional 34 can manipulate handle 32 to position distal end 36 so that electrodes 40 engage cardiac tissue at a desired location or locations. Upon positioning the distal end 36 so that electrodes 40 can engage cardiac tissue, the medical professional 34 can activate the medical probe 22 such that electrical pulses are delivered by the electrodes 40 to perform the IRE ablation.

In the configuration shown in FIG. 1, control console 24 is connected, by a cable 42, to body surface electrodes, which typically include adhesive skin patches 44 that are affixed to patient 28. Control console 24 includes a processor 46 that, in conjunction with a tracking module 48, determines location coordinates of distal end 36 inside heart 26. Location coordinates can be determined based on electromagnetic position sensor output signals provided from the distal portion of the catheter when in the presence of a generated magnetic field. Location coordinates can additionally, or alternatively be based on impedances and/or currents measured between adhesive skin patches 44 and electrodes 40 that are affixed to basket assembly 38. In addition to being used as location sensors during a medical procedure, electrodes 40 may perform other tasks such as ablating tissue in the heart.

As described hereinabove, in conjunction with tracking module 48, processor 46 may determine location coordinates of distal end 36 inside heart 26 based on impedances and/or currents measured between adhesive skin patches 44 and electrodes 40. Such a determination is typically after a calibration process relating the impedances or currents to known locations of the distal end has been performed. While embodiments presented herein describe electrodes 40 that are (also) configured to deliver IRE ablation energy to tissue in heart 26, configuring electrodes 40 to deliver any other type of ablation energy to tissue in any body cavity is considered to be within the spirit and scope of the present invention. Furthermore, although described in the context of being electrodes 40 that are configured to deliver IRE ablation energy to tissue in the heart 26, one skilled in the art will appreciate that the disclosed technology can be applicable to electrodes used for mapping and/or determining various characteristics of an organ or other part of the patient's 28 body.

Processor 46 may include real-time noise reduction circuitry 50 typically configured as a field programmable gate array (FPGA), followed by an analog-to-digital (A/D) signal conversion integrated circuit 52. The processor can be programmed to perform one or more algorithms and uses circuitry 50 and circuit 52 as well as features of modules to enable the medical professional 34 to perform the IRE ablation procedure.

Control console 24 also includes an input/output (I/O) communications interface 54 that enables control console 24 to transfer signals from, and/or transfer signals to electrodes 40 and adhesive skin patches 44. In the configuration shown in FIG. 1, control console 24 additionally includes an IRE ablation module 56 and a switching module 58.

IRE ablation module 56 is configured to generate IRE pulses having peak power in the range of tens of kilowatts. In some examples, the electrodes 40 are configured to deliver electrical pulses having a peak voltage of at least 900 volts (V). The medical system 20 performs IRE ablation by delivering IRE pulses to electrodes 40. Preferably, the medical system 20 delivers biphasic pulses between electrodes 40 on the spine. Additionally, or alternatively, the medical system 20 delivers monophasic pulses between at least one of the electrodes 40 and a skin patch.

The system 20 may supply irrigation fluid (e.g., a saline solution) to distal end 36 via a channel (not shown) in tubular shaft 30. Control console 24 includes an irrigation module 60 to monitor and control irrigation parameters, such as the pressure and the temperature of the irrigation fluid.

Based on signals received from electrodes 40 and/or adhesive skin patches 44, processor 46 can generate an electroanatomical map 62 that shows the location of distal end 36 in the patient's body. During the procedure, processor 46 can present map 62 to medical professional 34 on a display 64, and store data representing the electroanatomical map in a memory 66. Memory 66 may include any suitable volatile and/or non-volatile memory, such as random-access memory or a hard disk drive.

In some embodiments, medical professional 34 can manipulate map 62 using one or more input devices 68. In alternative embodiments, display 64 may include a touchscreen that can be configured to accept inputs from medical professional 34, in addition to presenting map 62.

Figure 2A:
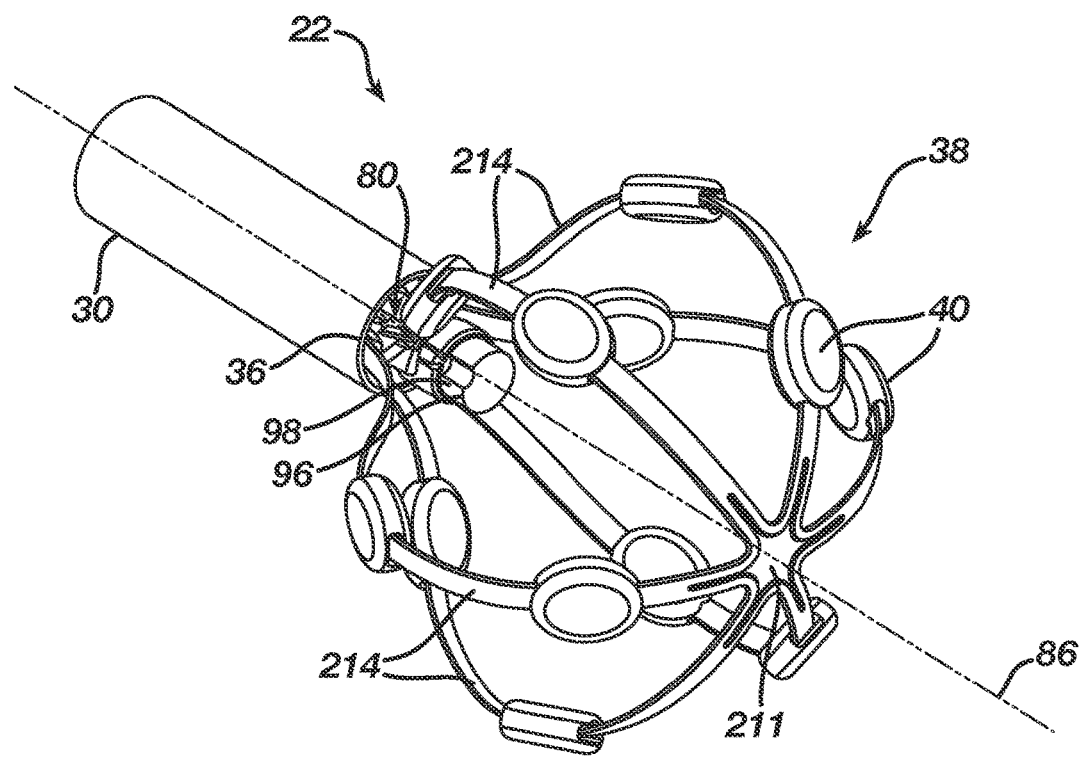
FIG. 2A is a schematic pictorial illustration showing a perspective view of a medical probe in an expanded form, in accordance with an embodiment of the present invention.
Figure 2B:
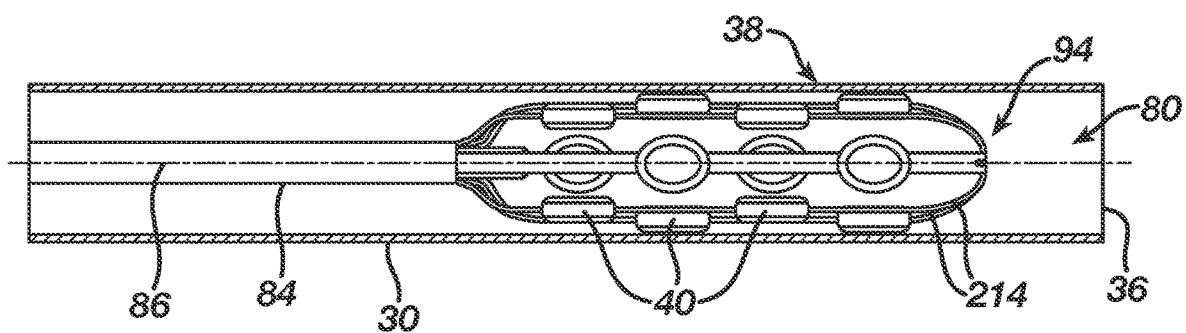
FIG. 2B is a schematic pictorial illustration showing a side view of a medical probe in a collapsed form, in accordance with the disclosed technology.

FIG. 2A is a schematic pictorial illustration showing a perspective view of a medical probe 22 having a basket assembly 38 in an expanded form when unconstrained, such as by being advanced out of a tubular shaft lumen 80 at a distal end 36 of a tubular shaft 30. FIG. 2B shows the basket assembly in a collapsed form within tubular shaft 30. In the expanded form (FIG. 2A), the spines 214 bow radially outwardly and in the collapsed form (FIG. 2B) the spines are arranged generally along a longitudinal axis 86 of tubular shaft 30.

As shown in FIG. 2A, basket assembly 38 includes a plurality of flexible spines 214 that are formed at the end of a tubular shaft 84 and are connected at both ends. During a medical procedure, medical professional 34 can deploy basket assembly 38 by extending tubular shaft 84 from tubular shaft 30 causing the basket assembly 38 to exit the tubular shaft and transition to the expanded form. Spines 214 may have elliptical (e.g., circular) or rectangular (that may appear to be flat) cross-sections, and include a flexible, resilient material (e.g., a shape-memory alloy such as nickel-titanium, also known as Nitinol) forming a strut as will be described in greater detail herein.

In embodiments described herein, electrodes 40 can be configured to deliver ablation energy (RF and/or IRE) to tissue in heart 26. In addition to using electrodes 40 to deliver ablation energy, the electrodes can also be used to determine the location of basket assembly 38 and/or to measure a physiological property such as local surface electrical potentials at respective locations on tissue in heart 26. The electrodes 40 can be biased such that a greater portion of the electrode 40 faces outwardly from the basket assembly 39 such that the electrodes 40 deliver a greater amount of electrical energy outwardly away from the basket assembly 38 (i.e., toward the heart 26 tissue) than inwardly toward the basket catheter 38.

Examples of materials ideally suited for forming electrodes 40 include gold, platinum, and palladium (and their respective alloys). These materials also have high thermal conductivity which allows the minimal heat generated on the tissue (i.e., by the ablation energy delivered to the tissue) to be conducted through the electrodes to the back side of the electrodes (i.e., the portions of the electrodes on the inner sides of the spines), and then to the blood pool in heart 26.

Basket assembly 38 has a distal end 94 and includes a stem 96 that extends longitudinally from a distal end 36 of shaft 84 towards distal end 94 of basket assembly 38. As described supra, control console 24 includes irrigation module 60 that delivers irrigation fluid to distal end 36. Stem 96 includes multiple spray ports 98, wherein each given spray port 98 can be angled to aim delivery of the irrigation fluid to either a given electrode 40 or to tissue in heart 26.

Since electrodes 40 do not include spray ports that deliver irrigation fluid, the configuration described hereinabove enables heat to be transferred from the tissue (i.e., during an ablation procedure) to the portion of the electrodes 40 on the inner side of the spines 214, and the electrodes 40 can be cooled by aiming the irrigation fluid, via spray ports 98, at the portion of the electrodes 40 on the inner side of the spines 214.

Figure 3A:
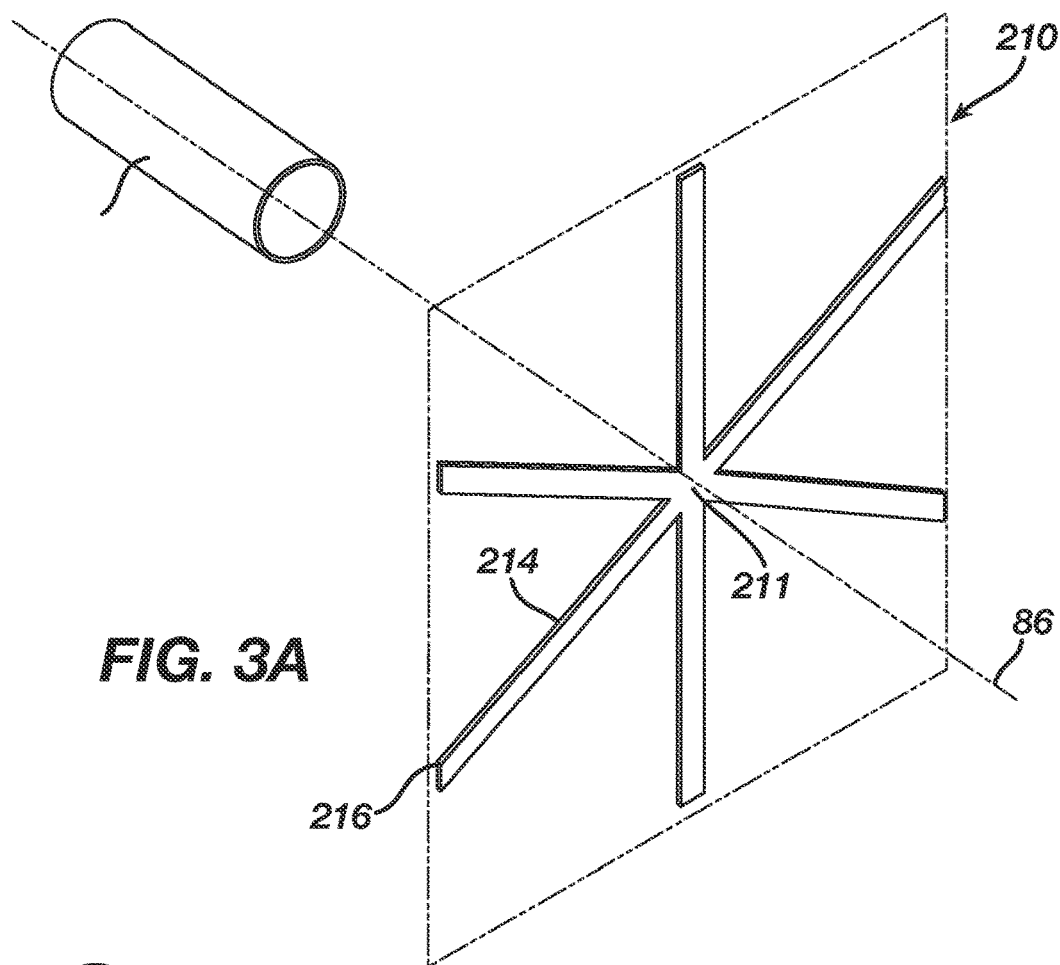
FIGS. 3A and 3B are schematic pictorial illustrations showing exploded views of a tubular shaft and spines of the basket assembly to illustrate how the spines can be assembled together with the tubular shaft, in accordance with an embodiment of the present invention.
Figure 3B:
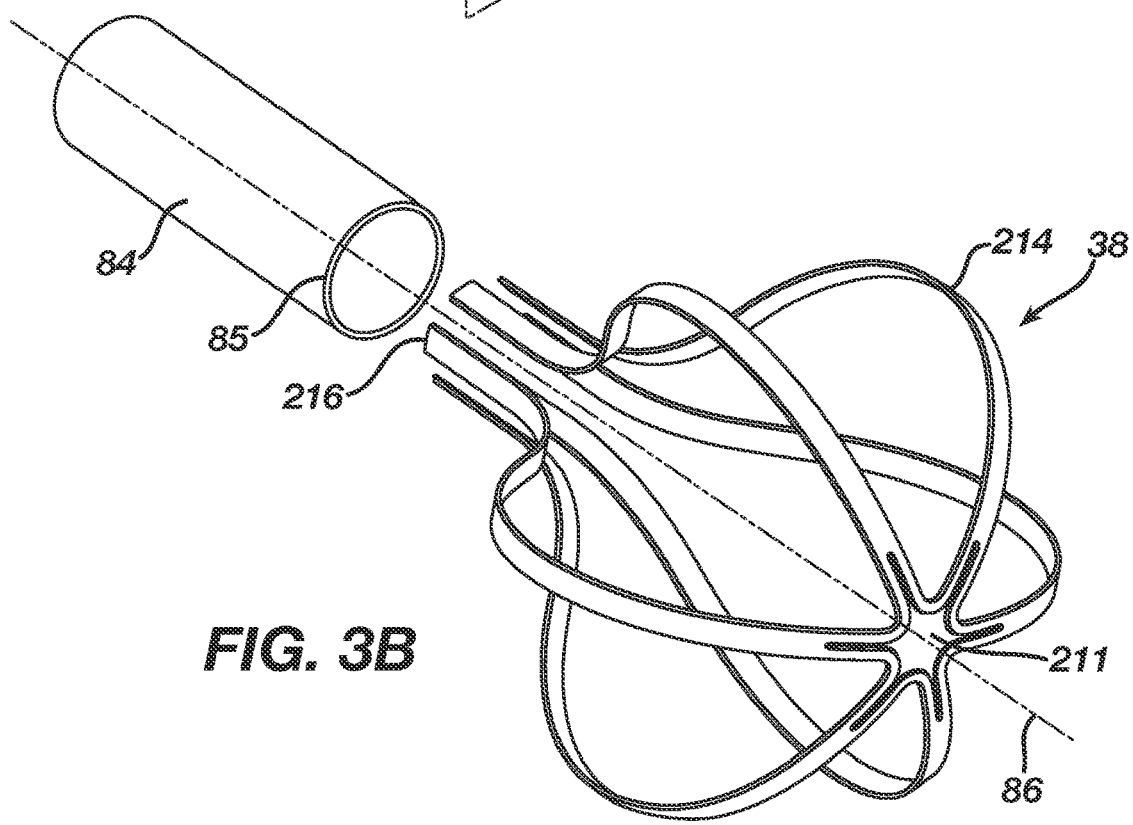

FIGS. 3A and 3B are schematic pictorial illustrations showing exploded views of a tubular shaft 84 and spines 214 of the basket assembly 38 to provide one example of how the spines 214 can be assembled together with the tubular shaft 84, in accordance with an embodiment of the present invention. As shown in FIG. 3A, the spines 214 can form a spine assembly 210. The spines 214 can be formed from a single sheet of planar material to form a generally star shape. In other words, the spines 214 can be formed from the single sheet of planar material such that the spines 214 converge toward a central intersection 211. The intersection 211 can be a solid piece of material (as shown in FIG. 3A) or include one or more apertures (as shown in FIG. 3B).

The spines 214 can be folded or otherwise bent such that a proximal end 216 of the spines 214 can be inserted into the distal end 85 of the tubular shaft 84 as shown in FIG. 3B. Although not shown in FIGS. 3A and 3B, it will be appreciated that the electrodes 40 can be attached to the spines 214 before the spines are inserted into the tubular shaft 84 to form the basket assembly 38. As stated previously, the spines 214 can include a flexible, resilient material (e.g., a shape-memory alloy such as nickel-titanium, also known as Nitinol) that can enable the basket assembly 38 to transition from its collapsed form (as shown in FIG. 2B) to its expanded form (as shown in FIG. 2A) when the basket assembly 38 is deployed from tubular shaft 30. As will become apparent throughout this disclosure, the spine 214 can be electrically isolated from the electrode 40 to prevent arcing from the electrode 40 to the spine 214.

As will be appreciated by one skilled in the art with the benefit of this disclosure, the basket assembly 38 shown in FIGS. 2A-3B having spines 214 formed from a single sheet of planar material and converging at a central intersection is offered merely for illustrative purposes and the disclosed technology can be applicable to other configurations of basket assemblies 38. For example, the disclosed technology can be applicable to basket assemblies 38 formed from a single spine 214 or multiple spines 214 with each spine 214 being attached at both ends. In other examples, the basket assembly 38 can include a central hub connecting the multiple spines 214 together at a distal end 94 of the basket assembly 38. In yet other examples, the basket assembly 38 can include a single spine 214 configured to form a spiral, multiple spines 214 configured to form a spiral, multiple spines 214 configured to form a tripod or multiple tripods, or any other shape of basket assembly 38. Thus, although FIGS. 2A-3B illustrate a specific configuration of basket assembly 38, the disclosed technology should not be construed as so limited. As well, the spine assembly 210 can be formed by laser cutting a cylindrical hollow stock material whereby the laser is mounted for rotation about the longitudinal axis (and translation thereto) of the cylindrical stock while cutting.

Figure 4A:
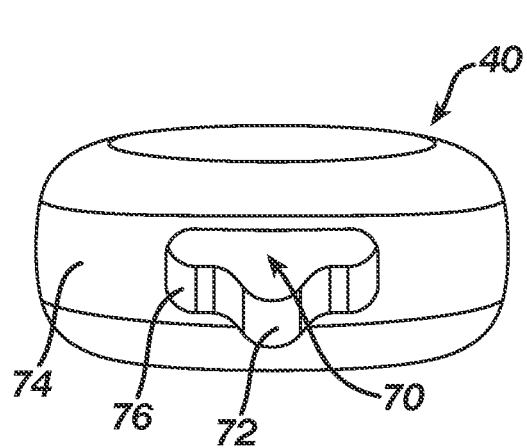
FIGS. 4A and 4B are schematic pictorial illustrations showing perspective views of an electrode, in accordance with an embodiment of the present invention.
Figure 4B:
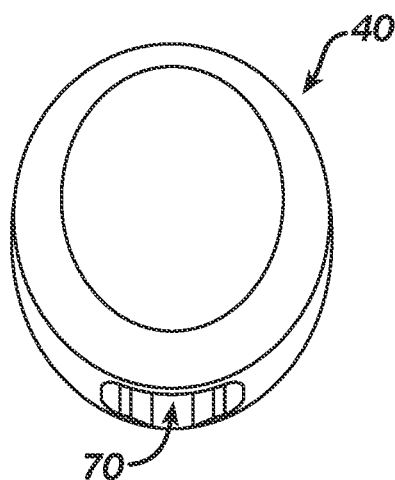
Figure 4C:
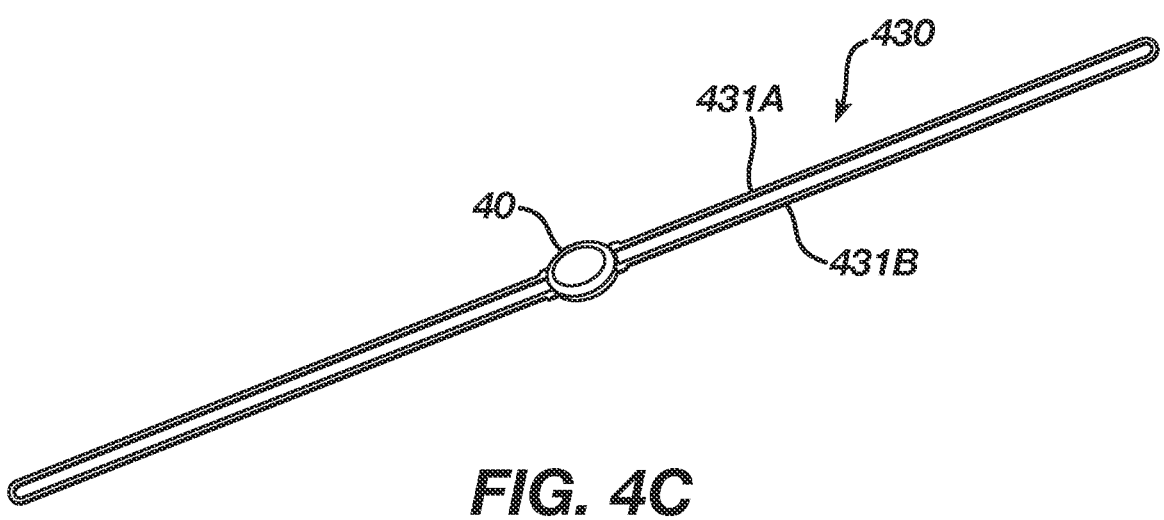
FIG. 4C is a schematic pictorial illustration showing a perspective view of an electrode and a strut of a given medical probe, in accordance with an embodiment of the present invention.

FIGS. 4A and 4B are schematic pictorial illustrations showing perspective views of an electrode 40 while FIG. 4C is a schematic pictorial illustration showing a perspective view of an electrode 40 and a strut 430 of a given medical probe 22, in accordance with an embodiment of the present invention. The electrode 40 includes a lumen 70 which extends through the electrode 40 from a first end to a second end of the electrode 40. The electrode 40 can have an outer surface 74 facing outwardly from the electrode 40 and an inner surface 76 facing inwardly toward the electrode 40 where the lumen 70 is formed through the electrode 40. The lumen 70 can be sized and configured to receive a strut 430, as shown in FIG. 4C, such that the strut 430 can pass through the lumen 70. In some examples, the lumen 70 can pass through the electrode 40 in a generally longitudinal direction of the electrode 40. In other examples, the lumen 70 can pass through the electrode 40 in a generally transverse direction of the electrode 40. Furthermore, the lumen 70 can be positioned in the electrode 40 nearer a bottom surface, nearer at top surface, or nearer a middle of the electrode 40 depending on the particular configuration.

By including a lumen 70 that is sized to receive a strut 430 of the medical probe 22, the disclosed technology can ensure the electrodes 40 are secured to the spines 214 and prevented from breaking free. Thus, even if the electrodes 40 become dislodged, the electrodes 40 will remain attached to the spines 214 by nature of the strut 430 passing through the lumen 70.

The lumen 70 can further include a relief 72 forming a recess or depression in the electrode 40. The relief 72 can be sized to provide room for a wire of the electrode 40 to pass through the electrode 40 such that the electrode 40 can be in electrical communication with the control console 24.

Figure 5A:
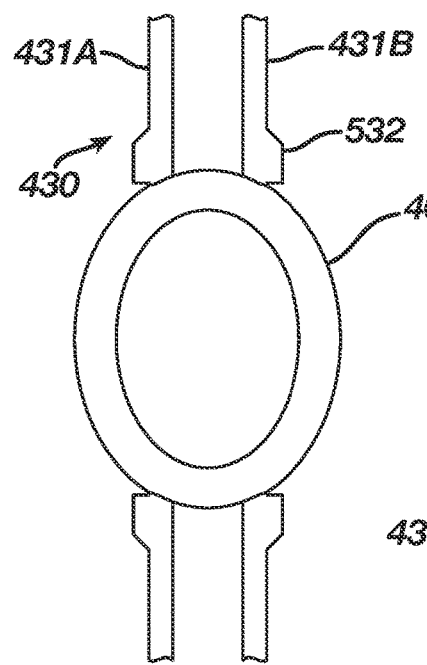
FIGS. 5A and 5B are schematic pictorial illustrations showing perspective detailed views of an electrode and struts of a given medical probe, in accordance with an embodiment of the present invention.
Figure 5B:
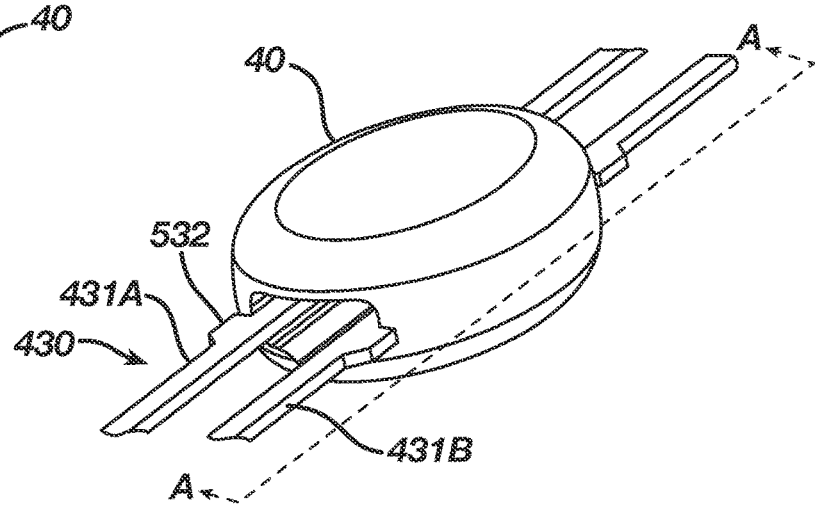
Figure 5C:
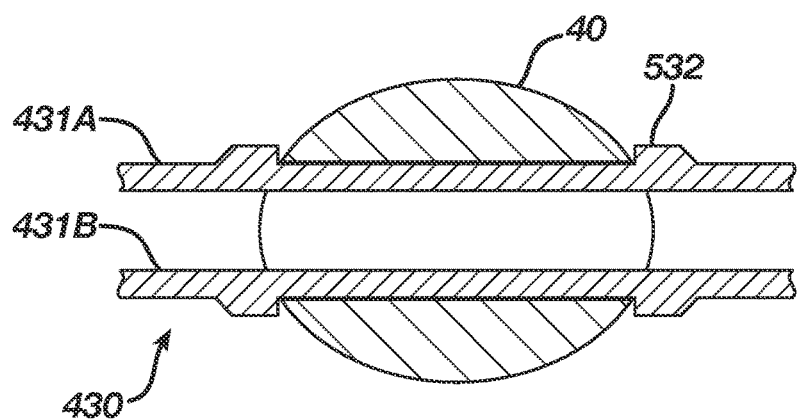
FIG. 5C is a schematic pictorial illustration showing a cutaway view of the electrode and struts taken along line A-A of FIG. 5B, in accordance with an embodiment of the present invention.

FIGS. 5A and 5B are schematic pictorial illustrations showing perspective detailed views of an electrode 40 and struts 430 of a given medical probe while FIG. 5C is a schematic pictorial illustration showing a cutaway view of the electrode 40 and struts 430 taken along line A-A of FIG. 5B, in accordance with an embodiment of the present invention.

The strut 430 can include a mechanical retainer that can prevent the electrode 40 from sliding proximally or distally along a length of the strut 430 and, ultimately, the spine 214. In some examples, the spine 214 can be sized to form an interference fitting between the spine 214 and the lumen 70 of the electrode to prevent the electrode 40 from sliding proximally or distally along a length of the strut 430. In other examples, the strut can include features that can prevent the electrode 40 from sliding proximally or distally along a length of the strut 430. For example, as illustrated in FIGS. 5A-5C, the mechanical retainer can include one or more protrusions 532 extending outwardly from the strut 430. The protrusions 532 can extend outwardly from the strut 430 such that the width of the strut 430 when taken from an outer edge of one protrusion 532 to an outer edge of an opposing protrusion 532 is greater than a width of the rest of the strut 430 and greater than a width of the lumen 70. Thus, when the strut 430 is inserted into the lumen and the protrusions 532 are positioned near the electrode 40, as illustrated in FIGS. 5A-5C, the electrode 40 is prevented from sliding proximally or distally along the length of the strut 430 because the electrode 40 is unable to slide past the protrusions 532.

As shown in FIG. 4C and FIGS. 5A-5C, the strut 430 can include two halves forming a first strut 431A and a second strut 431B. The first and second struts 431A, 431B can be spaced apart from each other. Because the strut 430 is made from a flexible resilient material, the strut 430 can be configured such that the first and second struts 431A, 431B can be pushed toward each other to cause a width of the strut 430 to be reduced. In this way, the strut 430 along with the protrusions 532 can be configured to pass through the lumen 70. To illustrate, by pushing the first and second struts 431A, 431B toward each other to reduce a width of the strut 430, the protrusions 532 can be brought closer to each other such that the width of the strut 430 when taken from the outer edge of one protrusion 532 to the outer edge of the opposing protrusion 532 can be smaller than the width of the lumen 70. When the first and second struts 431A, 431B are released and no longer pushed toward each other, the first and second struts 431A, 431B can revert back to their normal position and the width of the strut 430 from the outer edge of one protrusion 532 to the outer edge of the opposing protrusion 532 can once again be greater than the width of the lumen 70. As will be appreciated, the electrode 40 can be positioned between the protrusions 532 such that the electrode 40 is prevented from sliding distally and radially along a length of the strut 430 when the first and second struts 431A, 431B are released.

The protrusions 532 can also be angled so that as the electrode 40 is moved over the strut 430, and over the angled portions of the protrusions 532, the first and second struts 431A, 431B move toward each other. The first and second struts 431A, 431B can resiliently move apart once the electrode 40 is over the protrusions 532. The electrode is ultimately positioned between proximal and distal protrusions 532 and secured in place.

Figure 6A:
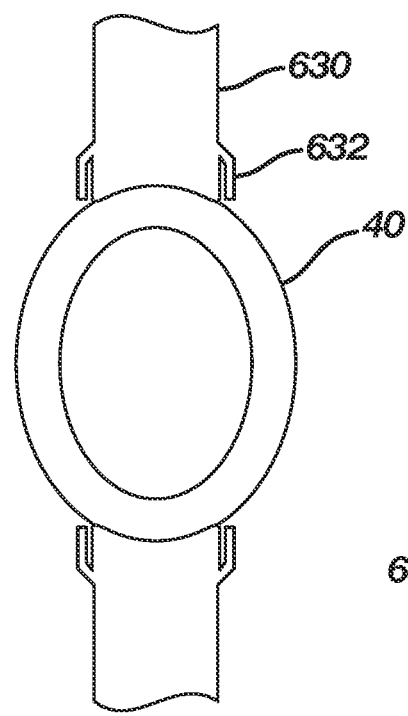
FIGS. 6A and 6B are schematic pictorial illustrations showing perspective detailed views of an electrode and a strut of a given medical probe, in accordance with another embodiment of the present invention.
Figure 6B:
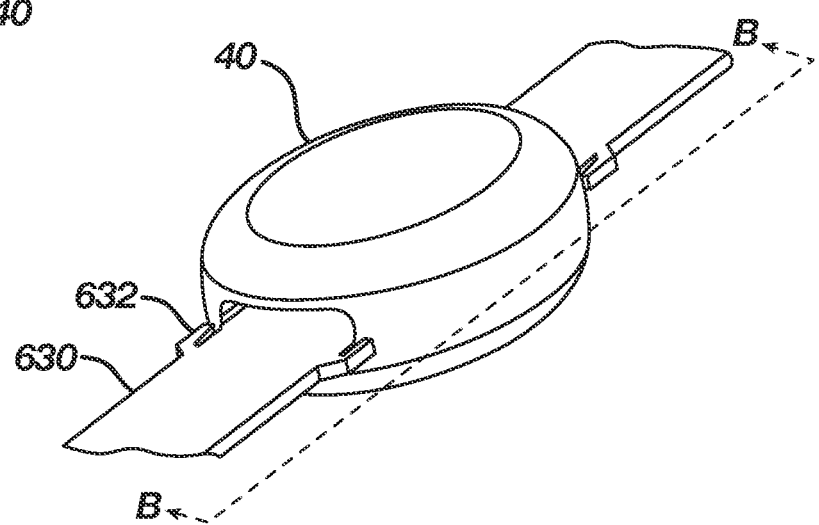

FIGS. 6A and 6B are schematic pictorial illustrations showing perspective detailed views of an electrode 40 and a strut 630 of a given medical probe 22, in accordance with another embodiment of the present invention. Unlike the strut 430 illustrated in FIGS. 4C-5C, the strut 630 does not include a first strut 431A or a second strut 431B. Rather, the strut 630 includes a single strut 630 and one or more deflectable protrusions 632.

Figure 6C:
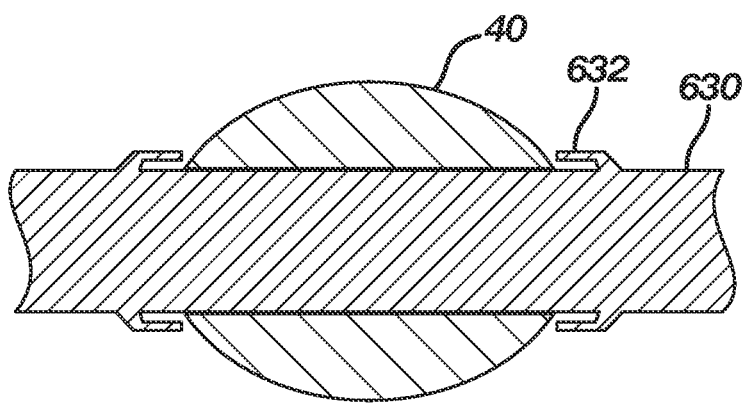
FIG. 6C is a schematic pictorial illustration showing a cutaway view of the electrode and strut taken along line B-B of FIG. 6B, in accordance with an embodiment of the present invention.

The deflectable protrusions 632 can be configured to be deflected toward the strut 630 when the deflectable protrusions 632 contact the electrode 40. For example, as illustrated in FIG. 6C showing a cutaway view of the electrode 40 and the strut 630, the deflectable protrusions 632 can be arranged such that the deflectable protrusions 632 allow the electrode 40 to slide over the deflectable protrusions 632 in a first direction but prevent the electrode 40 from sliding over the deflectable protrusions 632 in a second direction. To illustrate, as shown in FIGS. 6A-6C, the deflectable protrusions 632 can be configured such that the electrode 40 can slide along the strut 630, contact a sloped edge of the deflectable protrusions 632, and then be slid over the deflectable protrusions 632 as the deflectable protrusions 632 bend toward the strut 630. Once positioned between the deflectable protrusions 632, the electrode 40 can be prevented from sliding proximally or distally along the length of the strut 630 because the deflectable protrusions 632 are configured to prevent the electrode 40 from sliding back over the deflectable protrusions 632.

Although FIGS. 6A-6C show a particular configuration of deflectable protrusions, one of skill in the art will appreciate that other configurations of deflectable protrusions fall within the scope of this disclosure. For example, the deflectable protrusions 632 may include a cutaway portion of the strut 630 to allow for the deflectable protrusions 632 to be pushed flush with an outer edge of the strut 630 when the electrode 40 is slid onto the strut 630. As another example, the deflectable protrusions may include a spring biased component to cause the deflectable protrusions 632 to return to position after having been deflected by contacting the electrode 40 as the electrode 40 is pushed onto the strut 630.

Figure 7A:
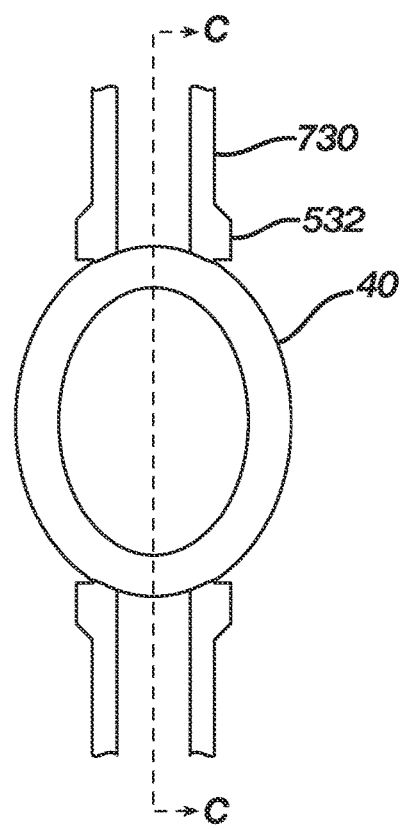
FIGS. 7A and 7B are schematic pictorial illustrations showing perspective detailed views of an electrode and struts of a given medical probe, in accordance with another embodiment of the present invention.
Figure 7B:
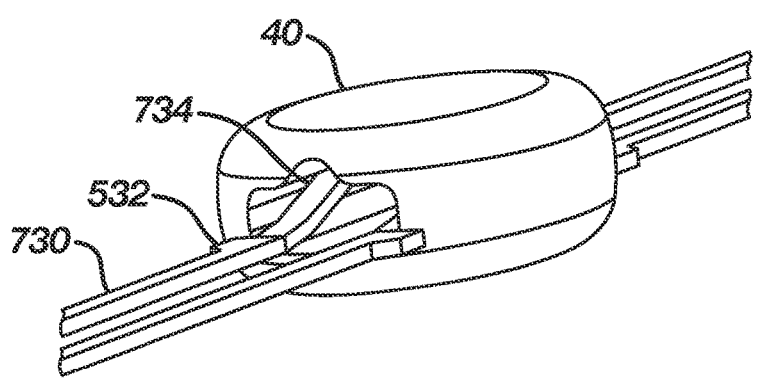
Figure 7C:
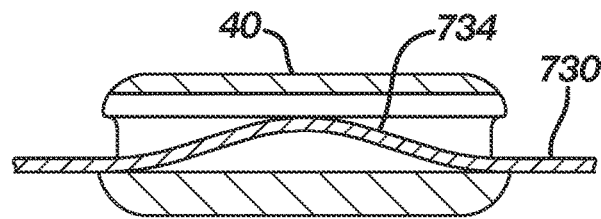
FIG. 7C is a schematic pictorial illustration showing a cutaway view of the electrode and struts taken along line C-C of FIG. 7A, in accordance with another embodiment of the present invention.

FIGS. 7A and 7B are schematic pictorial illustrations showing perspective detailed views of an electrode 40 and struts 730 of a given medical probe 22 while FIG. 7C is a schematic pictorial illustration showing a cutaway view of the electrode 40 and struts 730 taken along line C-C of FIG. 7A, in accordance with another embodiment of the present invention. Unlike strut 430 and strut 630, the mechanical retainer of the strut 730 can include a bend 734 forming a spring bias in the strut 730. As will be appreciated by one skilled in the art, the bend 734 can cause the strut 730 to form a friction fit with the inner surface 76 of the electrode 40 (e.g., at a top and a bottom of the lumen 70). In other words, the bend 734 can cause the strut 730 to contact, or otherwise cause a portion of the spine 214 to contact, the inner surface 76 of the electrode 40 and be retained in place by the friction interference between the strut 730 (or the spine 214) and the inner surface 76 of the electrode 40. By forming a friction fit with the inner surface 76 of the electrode 40, the strut 730 can help prevent the electrode 40 from sliding distally or proximally along the length of the strut 730 as a result of the friction present at the friction fit location between the strut 730 and the electrode 40. The bend 734 can be sized to extend from proximate a first end of the electrode 40 to proximate a second end of the electrode 40. Furthermore, the electrode 40 can also have a recess (not illustrated) to accept the bend 734 to allow it to be properly placed on the strut 730.

The strut 730 can further include protrusions 532 similar to strut 430 to help prevent the electrode 40 from sliding proximally or distally along the length of the strut 730. Furthermore, although shown in FIGS. 7A-7C as having a strut with two portions (i.e., first strut 431A and second strut 431B) and protrusions 532 similar to strut 430, one of skilled in the art will appreciate that the strut 730 can include a single strut and deflectable protrusion 632 similar to strut 630.

Figure 8A:
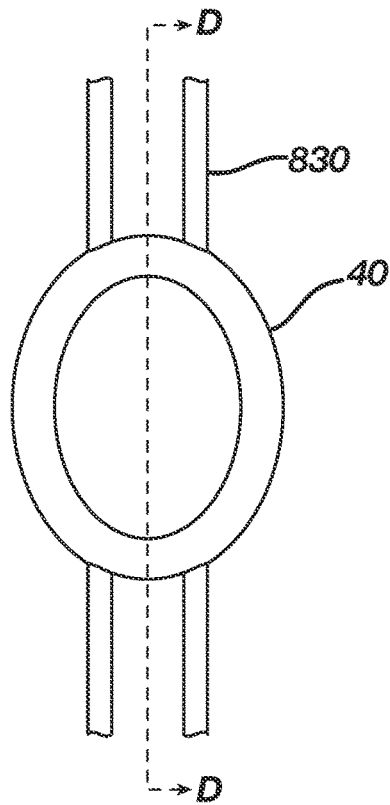
FIGS. 8A and 8B are schematic pictorial illustrations showing perspective detailed views of an electrode and struts of a given medical probe, in accordance with another embodiment of the present invention.
Figure 8B:
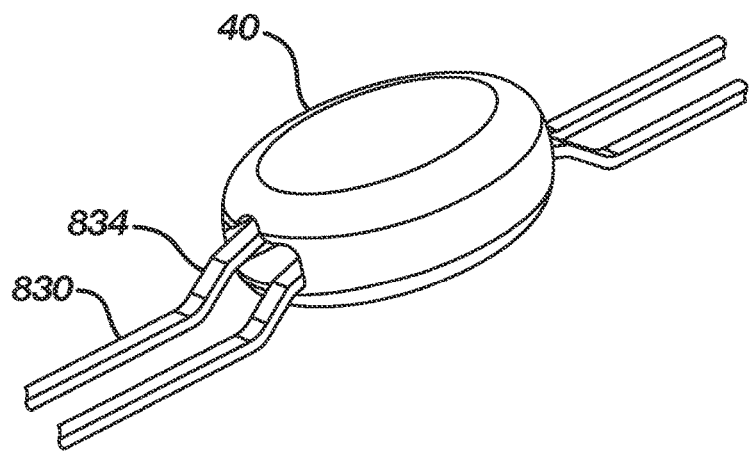
Figure 8C:
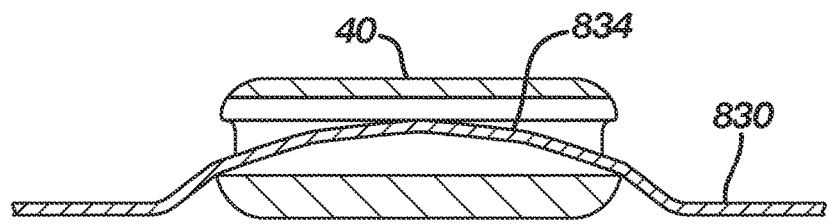
FIG. 8C is a schematic pictorial illustration showing a cutaway view of the electrode and struts taken along line D-D of FIG. 8A, in accordance with another embodiment of the present invention.
Figure 9A:
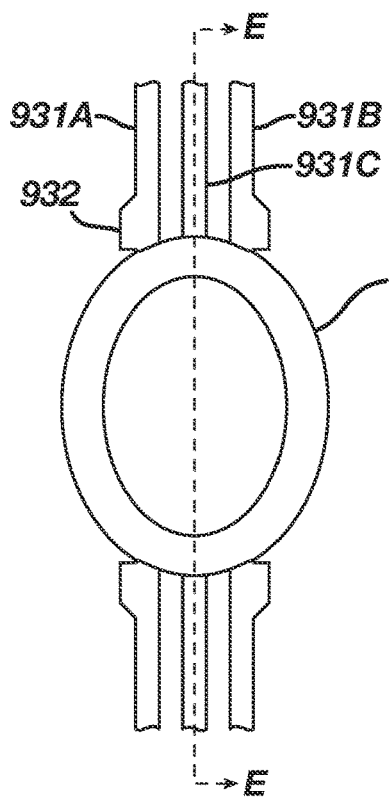
FIGS. 9A and 9B are schematic pictorial illustrations showing perspective detailed views of an electrode and struts of a given medical probe, in accordance with another embodiment of the present invention.
Figure 9B:
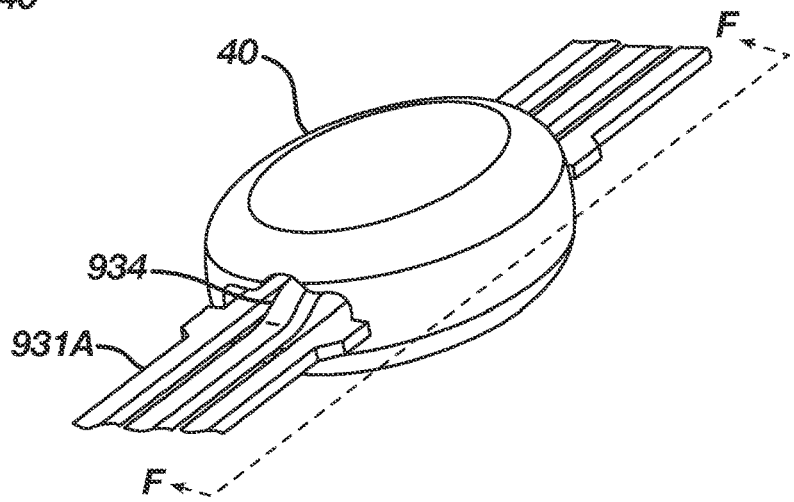
Figure 9C:
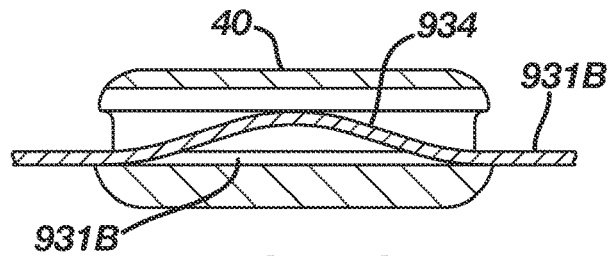
FIG. 9C is a schematic pictorial illustration showing a cutaway view of the electrode and struts taken along line E-E of FIG. 9A, in accordance with another embodiment of the present invention.
Figure 9D:
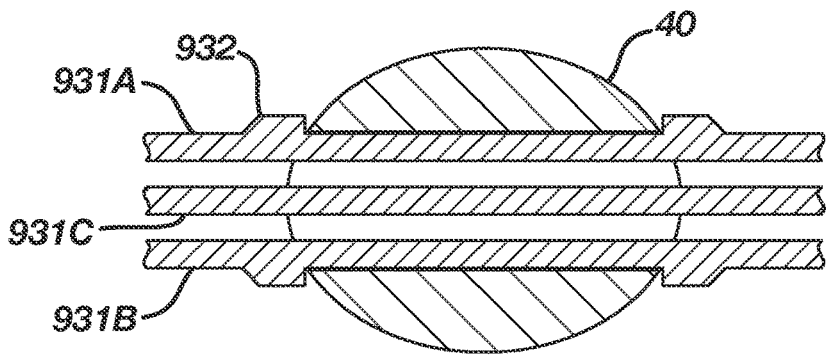
FIG. 9D is a schematic pictorial illustration showing a cutaway view of the electrode and struts taken along line F-F of FIG. 9B, in accordance with another embodiment of the present invention.

FIGS. 8A and 8B are schematic pictorial illustrations showing perspective detailed views of an electrode 40 and struts 830 of a given medical probe while FIG. 8C is a schematic pictorial illustration showing a cutaway view of the electrode and struts taken along line D-D of FIG. 8A, in accordance with another embodiment of the present invention. Similar to strut 730, strut 830 can include a bend 834 forming a spring bias in the strut 830 to help prevent the electrode 40 from sliding proximally or distally along the length of the strut 830. Unlike strut 730, however, the bend 834 in the strut 830 can extend from beyond a first end of the electrode 40 to beyond a second end of the electrode. The bend 834 can cause the strut 830, or the spine 214, to contact the inner surface of the electrode 76 of the electrode 40 as well as an outer edge of the electrode 40. In this way, the strut 830 can prevent the electrode 40 from sliding proximally or distally along the length of the strut 830 without including protrusions 532 or deflectable protrusions 632. However, one skilled in the art will appreciate that the strut 830 can also include the protrusions 532 or deflectable protrusions 632. Furthermore, although shown in FIGS.

8A-8C as having a strut with two portions (i.e., first strut 431A and second strut 431B) and similar to strut 430, one skilled in the art will appreciate that the strut 830 can include a single strut similar to strut 630.

As will be appreciated, the strut 430 (or strut 630, 730, or 830) can include a combination of several of the features of the mechanical retainers described herein. For example, as illustrated in FIGS. 9A-9D, the medical probe 22 can include a strut 930 having a first strut 931A, a second strut 931B, and a third strut 931C. The first and second struts 931A, B can be configured substantially similar to the first and second struts 431A, 431B shown and described here in relation to FIGS. 4C-5C while the third strut 931C can include a bend 934 that can be substantially similar to the bend 734 or the bend 834. As shown, the third strut 931C including the bend 934 can be positioned between the first and second struts 931A, B. As will be appreciated by one skilled in the art, by including the first, second, and third struts 931A-931C, the electrode 40 can be better prevented from sliding distally or proximally along the length of the spine 214.

FIGS. 10A-10F are schematic pictorial illustrations showing various electrodes 1040A-F of a given medical device 22, in accordance with various embodiments of the present invention. The electrodes 1040A-F are offered to illustrate various configurations of electrodes 40 that can be used with the medical device 22 but should not be construed as limiting. One skilled in the art will appreciate that various other configurations of electrodes 40 can be used with the disclosed technology without departing from the scope of this disclosure.

FIGS. 10A and 10B illustrate an electrode 1040A having a lumen 1070 with a relief 1072. the lumen 1070 and the relief 1072 can be substantially similar to the lumen 70 and the relief 72 described herein. Unlike electrode 40, the electrode 1040A can include a substantially contoured shape. For example, as illustrated in FIGS. 10A and 10B, the electrode 1040A can include a convex side and a concave side. In some examples, the electrode 1040A can be configured to position the convex side to face outwardly from the basket assembly 38 when the electrode 1040A is attached to a spine 214 and assembled with the basket assembly 38.

FIGS. 10C and 10D illustrate an electrode 1040B having a lumen 1070. The lumen 1070 can be substantially similar to the lumen 70 described herein. Unlike the electrode 40 and the electrode 1070A, however, the electrode 1072B, can include a second lumen 1073 that is separate from the lumen 1070 and that can extend from a first side to a second side of the electrode 1070B. The second lumen 1073 can be configured to receive a wire of the medical probe 22, similar to the relief 72. Similar to electrode 1040A, electrode 1040B can have a substantially contoured shape. For example, as illustrated in FIGS. 10C and 10D, the electrode 1040B can include a convex side and a concave side. In some examples, the electrode 1040B can be configured to position the convex side to face outwardly from the basket assembly 38 when the electrode 1040B is attached to a spine 214 and assembled with the basket assembly 38.

FIGS. 10E and 10F illustrate another example electrode 1040C having a lumen 1070 and a second lumen 1073, similar to electrode 1040B. As illustrated in FIGS. 10E and 10F, the electrode 1040C can be shaped such that an upper side of the electrode 1040C includes substantially more material than a lower side of the electrode 1040C. In this way, a greater portion of the electrode 1040C can be positioned toward an outer side of the basket assembly 38 when the electrode 1040C is attached to a spine 214 and assembled with the basket assembly 38.

Figure 11A:
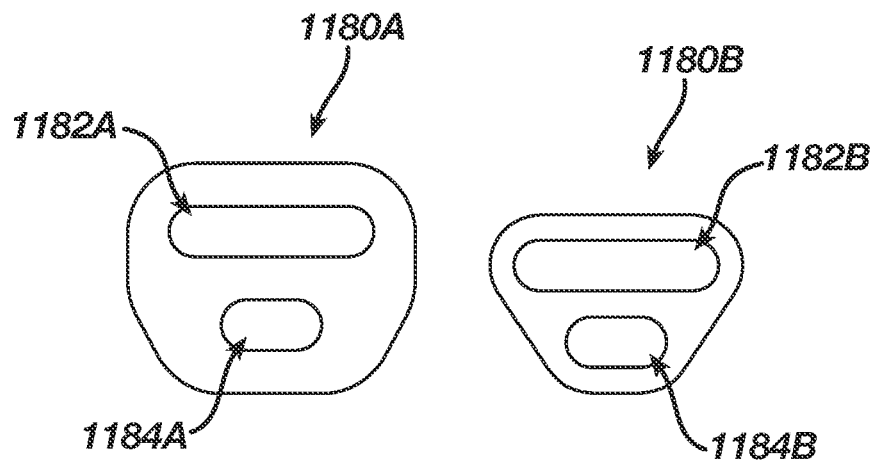
FIGS. 11A and 11B are schematic pictorial illustrations showing various insulative jackets of a given medical device, in accordance with embodiments of the present invention.
Figure 11B:
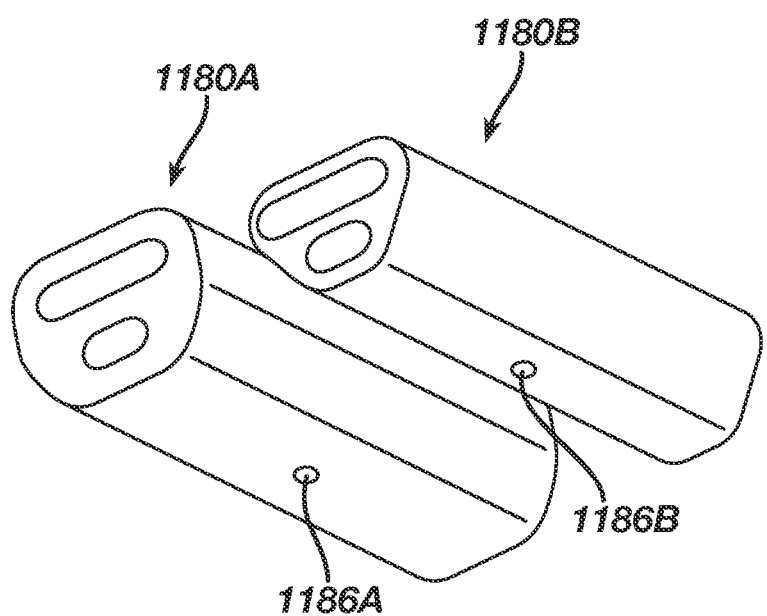

FIGS. 11A and 11B are schematic pictorial illustrations showing various insulative jackets 1180A, 1180B of a given medical device 22, in accordance with embodiments of the present invention. As will be appreciated by one of skill in the art, the insulative jackets 1180A, 1180B are offered for illustrative purposes and other insulative coverings are contemplated. For example, an insulative coating can be applied to the spine 214, the electrodes 40, or both. FIG. 11A is a front view while FIG. 11B is a perspective view of the insulative jackets 1180A, 1180B. The insulative jackets 1180A, 1180B can be made from a biocompatible, electrically insulative material such as such as polyamide-polyether (Pebax) copolymers, polyethylene terephthalate (PET), urethanes, polyimide, parylene, silicone, etc. In some examples, insulative material can include biocompatible polymers including, without limitation, polyetheretherketone (PEEK), polyglycolic acid (PGA), poly(lactic-co-glycolic acid) copolymer (PLGA), polycaprolactive (PCL), poly(3-hydroxybutyrate-co-3-hydroxyvalerate) (PHBV), poly-L-lactide, polydioxanone, polycarbonates, and polyanhydrides with the ratio of certain polymers being selected to control the degree of inflammatory response. Insulative jackets 1180A, 1180B may also include one or more additives or fillers, such as, for example, polytetrafluoroethylene (PTFE), boron nitride, silicon nitride, silicon carbide, aluminum oxide, aluminum nitride, zinc oxide, and the like. The insulative jacket 1180A, 1180B can help to insulate a strut and/or wires passing through the insulative jacket 1180A, 1180B from the electrode 40 to prevent arcing from the electrode 40 to the strut and/or wires passing through the insulative jacket 1180A, 1180B.

As illustrated in FIGS. 11A and 11B, the insulative jacket 1180A, 1180B, can include a cross-sectional shape that is substantially trapezoidal. The insulative jacket may consist of a single lumen or multi-lumen configuration. Multi-lumen jackets may be configured such that the alloy frame and wires share a single lumen while the second lumen may be used for irrigation. The alloy frame and wires may occupy separate lumens, also, as described. For these designs, the insulative jackets may be continuous (individual sleeves extending from proximal to distal end of each alloy frame strut), segmented (bridging between electrode gaps), or a combination of both. Furthermore, the insulative jacket 1180A, 1180B can include a first lumen 1182A, 1182B and a second lumen 1184A, 1184B. The first lumen 1182A, 1182B can be configured to receive a strut while the second lumen 1184A, 1184B can be configured to receive a wire, or vice-versa. In other examples, the first lumen 1182A, 1182B and the second lumen 1184A, 1184B can each be configured to receive one or more wires that can be connected to one or more electrodes 40. Furthermore, as illustrated in FIG. 10B, the insulative jacket 1180A, 1180B can include an aperture 1186A, 1186B through which a wire can be electrically connected to the electrode 40. Although illustrated in FIG. 10B as being proximate a bottom of the insulative jacket 1180A, 1180B, the aperture 1186A, 1186B can be positioned proximate a top or side of the insulative jacket 1180A, 1180B. Furthermore, the insulative jacket 1180A, 1180B can include multiple apertures 1186A, 1186B with each aperture being disposed on the same side of the insulative jacket (i.e., top, bottom, left, right) or on different sides of the insulative jacket depending on the application.

Figure 12A:
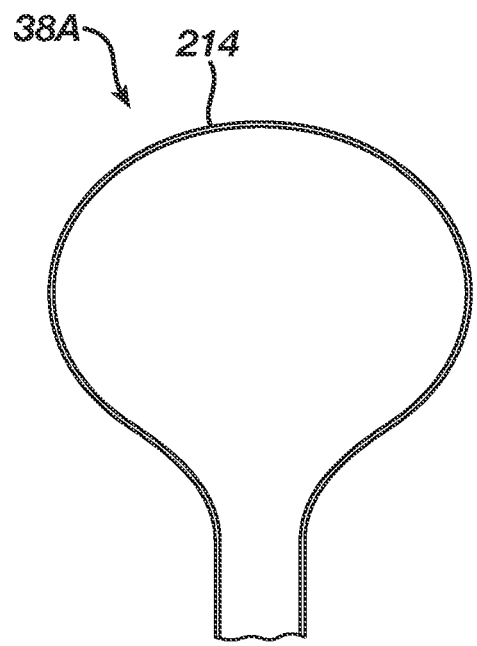
FIGS. 12A and 12B are schematic pictorial illustrations showing a side view of a spine of a given medical device, in accordance with embodiments of the present invention.
Figure 12B:
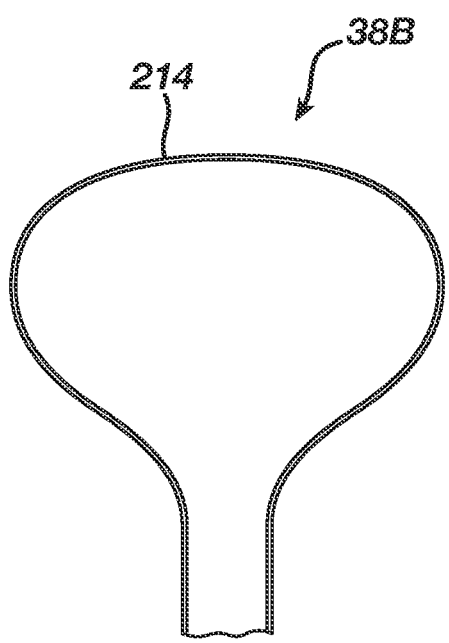

FIGS. 12A and 12B are schematic pictorial illustrations showing a side view of a spine 214 of a given medical device 22, in accordance with embodiments of the present invention. As will be appreciated, the spine 214 illustrated in FIGS. 12A and 12B is a single spine 214 and can be representative of the plurality of spines 214 of the basket assembly 38 described herein. In other words, the plurality of spines 214 forming the basket assembly 38 can each be configured to form the same or similar shape when in the expanded form such that the plurality of spines 214 together form a desired shape. To illustrate, the spine 214 as shown in FIG. 12A can be configured to form an approximately circular shape when in the expanded form. Thus, when combined with other spines 214 to form the basket assembly 38, the plurality of spines 214 can be configured to form an approximately spherical shape when the basket assembly 38 is in the expanded form. As another example, the spine 214 shown in FIG. 12B can be configured to form an approximately elliptical shape when in the expanded form. Thus, when combined with other spines 214 to form the basket assembly 38, the plurality of spines 214 can be configured to form an approximately oblate-spheroid shape when the basket assembly 38 is in the expanded form. Although not every variation of shape is shown or described herein, one skilled in the art will appreciate that the spines 214 can be further configured to form other various shapes as would be suitable for the particular application.

By including spines 214 configured to form various shapes when in the expanded form, the basket assembly 38 can be configured to position the various electrodes 40 attached to the spines 214 at various locations, with each location being nearer or farther from the distal end of the flexible tubular shaft 30. For example, an electrode 40 attached to the spine 214 illustrated in FIG. 12A near the middle of the spine 214 would be farther from the distal end of the flexible tubular shaft 30 than the spine 214 illustrated in FIG. 12B when the basket assembly 38 is in the expanded form.

Figure 13A:
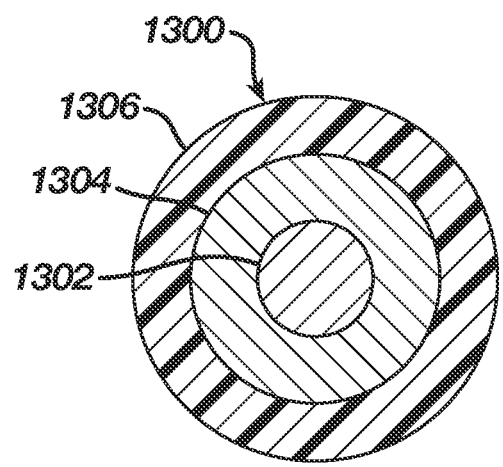
FIGS. 13A and 13B are schematic pictorial illustrations showing cross-sectional views of a given wire of a medical probe, in accordance with an embodiment of the present invention.
Figure 13B:
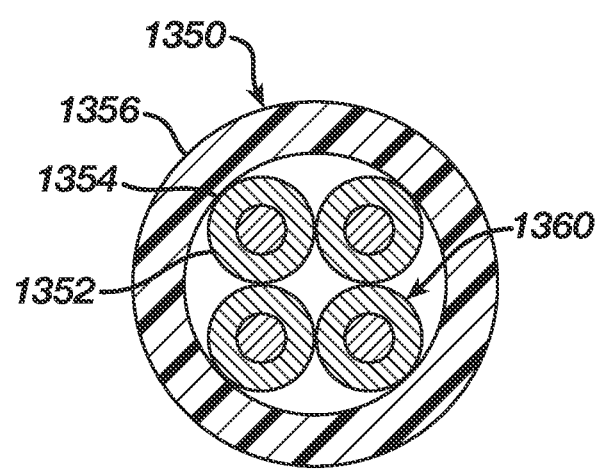

FIGS. 13A and 13B are schematic pictorial illustrations showing cross-sectional views of a given wire 1300, 1350 that can be connected to a given electrode 40, in accordance with an embodiment of the present invention. FIG. 13A illustrates a solid core wire 1300. FIG. 13B illustrates a stranded wire 1350. Each wire 1300, 1350 can extend through at least a portion of the tubular shaft 84. The solid core wire 1300 can include an electrically conductive core material 1302 and an electrically conductive cover material 1304 circumscribing electrically conductive core material 1302. Likewise, the stranded wire 1350 can include strands each including an electrically conductive core material 1352 and an electrically conductive cover material 1354 circumscribing the electrically conductive core material 1352. Each wire 1300, 1350 can include an insulative jacket 1306 circumscribing the conductors. The wires 1300, 1350 can be configured to withstand a voltage difference of adjacent wires sufficient to deliver IRE pulses. Preferably, the wires 1300, 1350 can withstand at least 900V, and more preferably at least 1,800V between adjacent wires. To reduce likelihood of dielectric breakdown between conductors of adjacent wires, the electrically conductive cover material 1304, 1354 can have a lower electrical conductivity compared to the core material 1302, 1352.

The insulative jacket 1306 can be configured to have a temperature rating between 150 and 200 degrees Centigrade so that the electrically insulative jacket 1306 melts or degrades (e.g., chars and crumbles) during soldering of the wire 1300 to the electrodes 40 (e.g., at a temperature of 300 degrees Centigrade) and therefore the insulative jacket 1306 of the wire 1300 does not need to be mechanically stripped. In other examples, the insulative jacket 1306 can have a temperature rating greater than 200 degrees Centigrade to prevent the electrically insulating material 1302 melting or degrading (e.g., charring and crumbling) during manufacture of the medical probe 22 and/or during use. The insulative jacket 1306 can be mechanically stripped from the wire 1300 prior to the wires 1300 being electrically connected to the electrodes 40.

Figure 14:
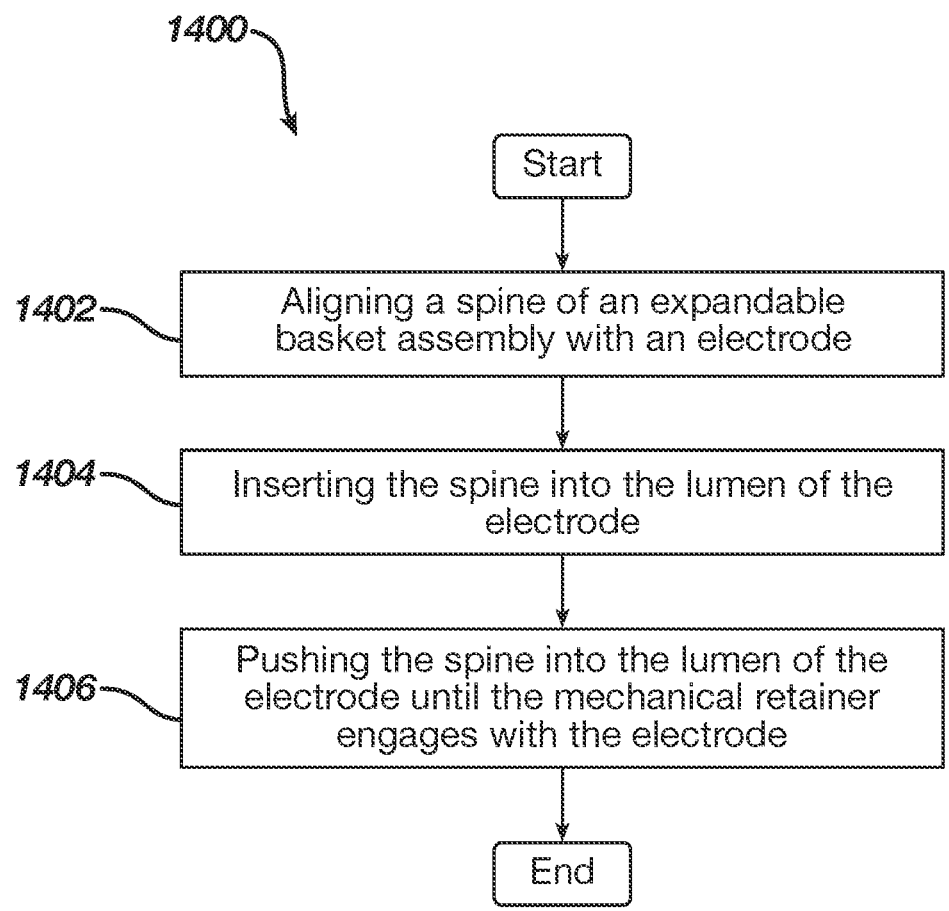
FIG. 14 is a flowchart illustrating a method of manufacturing a basket assembly, in accordance with an embodiment of the present invention.

FIG. 14 is a flowchart illustrating a method 1400 of manufacturing a basket assembly 38, in accordance with an embodiment of the present invention. The method 1400 can include aligning 1402 a spine 214 of an expandable basket assembly 38 with an electrode 40 (or electrode 1040A-1040C). For example, aligning 1402 a spine 214 with an electrode 40 can include aligning a distal or a proximal end of a spine 214 with the lumen 70 of the electrode 40. As will be appreciated by one skilled in the art with the benefit of this disclosure, the spine 214 can include any of struts 430, 630, 730, 830, 930 as shown and described herein. The method 1400 can further include inserting 1404 the spine 214 into the lumen 70 of the electrode 40 and pushing 1406 the spine into the lumen 70 of the electrode 40 until a mechanical retainer (i.e., protrusions 532, deflectable protrusions 632, bend 734, and/or bend 834) engages with the electrode 40.

As will be appreciated by one skilled in the art, the method 1400 can include any of the various features of the disclosed technology described herein and can be varied depending on the particular configuration. For example, the method 1400 can further include positioning the bend 734 bend to extend from proximate a first end of the electrode 40 to proximate a second end of the electrode 40 to cause the strut 730 to form a friction fit with a first portion and a second portion of an inner surface 76 of the electrode 40 (as described herein). As another example, the method 1400 can further include positioning the bend 834 to extend from a first distance beyond a first end of the electrode 40 to a second distance beyond a second end of the electrode 40 to cause the strut 830 to form a friction fit with an inner surface 76 of the electrode 40 and an outer edge of the electrode (e.g., outer surface 74). As yet another example, the method 1400 can include aligning 1402 the spine with a second electrode 40 (or electrode 1040A-1040C), inserting 1404 the spine 214 into the second electrode 40, and pushing the spine 214 into the lumen 70 of the second electrode 40 until the mechanical retainer (i.e., protrusions 532, deflectable protrusions 632, bend 734, and/or bend 834) engages with the electrode 40. In this way, the method 1400 can include attaching more than one electrode 40 to the spine 214 to form a basket assembly 38 having multiple electrodes 40.

The disclosed technology described herein can be further understood according to the following clauses:

Clause 1: A medical probe, comprising: a tubular shaft having a proximal end and a distal end, the tubular shaft extending along a longitudinal axis; and an expandable basket assembly coupled to the distal end of the tubular shaft, the basket assembly comprising: a plurality of electrodes, each electrode of the plurality of electrodes having a lumen therethrough; and a plurality of spines extending along the longitudinal axis and configured to bow radially outward from the longitudinal axis when the expandable basket assembly is transitioned from a collapsed form to an expanded form, each spine of the plurality of spines comprising: a proximal end; a distal end; and a strut passing through the lumen of an electrode of the plurality of electrodes, the strut comprising a mechanical retainer disposed on the strut, the mechanical retainer prevents the electrode from sliding proximally or distally along a length of the spine.

Clause 2: The medical probe according to Clause 1, wherein the mechanical retainer of the strut comprises one or more protrusions extending outwardly from the strut to form a lip that prevents the electrode from sliding proximally or distally along the length of the spine.

Clause 3: The medical probe according to Clause 2, wherein the strut comprises a first and a second strut each comprising a respective protrusion of the one or more protrusions, the first and second struts configured to be compressible toward each other to allow the respective protrusions to slide through the lumen of the electrode.

Clause 4: The medical probe according to Clause 3, wherein the first and second struts each comprise a respective pair of protrusions of the one or more protrusions, each pair of protrusions comprising a first protrusion positioned on a first side of the electrode and a second protrusion positioned on a second side of the electrode such that each pair of protrusions prevent the electrode from sliding proximally or distally along the length of the spine.

Clause 5: The medical probe according to any one of Clauses 1-4, wherein the mechanical retainer of the strut comprises a bend forming a spring bias in the strut, the spring bias causing the strut to form a friction fit with the electrode and prevent the electrode from sliding proximally or distally along the length of the spine.

Clause 6: The medical probe according to Clause 5, wherein the bend extends from proximate a first end of the electrode to proximate a second end of the electrode to cause the strut to form the friction fit at a first portion and a second portion of an inner surface of the electrode.

Clause 7: The medical probe according to Clause 5, wherein the bend extends from a first distance beyond a first end of the electrode to a second distance beyond a second end of the electrode to cause the strut to form the friction fit at an inner surface of the electrode and an outer edge of the electrode.

Clause 8: The medical probe according to any one of Clauses 5-7, wherein the strut comprises a first and a second strut each comprising a respective protrusion, wherein the first and second struts are configured to be compressible toward each other to allow the respective protrusions to slide through the lumen of the electrode, and wherein the first and second struts comprise the bend.

Clause 9: The medical probe according to Clause 5-7, wherein the strut comprises a first strut, a second strut, and a third strut positioned between the first and second struts, wherein the first and second struts each comprise a respective protrusion, wherein the first and second struts are configured to be compressible toward each other to allow the respective protrusions to slide through the lumen of the electrode, and wherein the third strut comprises the bend.

Clause 10: The medical probe according to Clause 1, wherein the spine of the plurality of spines comprises a first electrode and a second electrode, and wherein the strut comprises a first mechanical retainer configured to engage with the first electrode and a second mechanical retainer configured to engage with the second electrode, the first and second mechanical retainers being configured to prevent the first and second electrodes from sliding proximally or distally along a length of the spine when the first and second mechanical retainers are engaged with the first and second electrodes, respectively.

Clause 11: The medical probe according to any one of Clauses 1-10, wherein the mechanical retainer of the strut comprises an interference fitting.

Clause 12: The medical probe according to any of Clauses 1-11, further comprising a wire, wherein the lumen comprises a relief configured to receive the wire of the medical probe.

Clause 13: The medical probe according to Clause 12, wherein the wire is insulated from the strut.

Clause 14: The medical probe according to any of Clauses 12 and 13, wherein the wire is electrically connected to the electrode.

Clause 15: The medical probe according to any of Clauses 12-14, wherein at least a portion of the wire comprises an electrically conductive core material comprising a first electrical conductivity, an electrically conductive cover material comprising a second electrical conductivity less than the first electrical conductivity, the electrically conductive cover material circumscribing the electrically conductive core material, and an insulative jacket circumscribing the electrically conductive cover material.

Clause 16: The medical probe according to any of Clauses 12-14, wherein at least a portion of the wire comprises a plurality of strands and an insulative jacket circumscribing the plurality of strands, and wherein each strand of the plurality of strands respectively comprises an electrically conductive core material comprising a first electrical conductivity and an electrically conductive cover material comprising a second electrical conductivity less than the first electrical conductivity, the electrically conductive cover material circumscribing the electrically conductive core material.

Clause 17: The medical probe according to any of Clauses 1-16, wherein the strut comprises a material selected from a group consisting of nitinol, cobalt chromium, stainless steel, titanium.

Clause 18: The medical probe according to any of Clauses 1-16, wherein the strut comprises a polymer.

Clause 19: The medical probe according to any of Clauses 1-18, wherein the electrode comprises a ring type electrode.

Clause 20: The medical probe according to any of Clauses 1-18, wherein the electrode comprises a bulging type electrode.

Clause 21: The medical probe according to any of Clauses 1-18, wherein the electrode comprises a rectangular electrode.

Clause 22: The medical probe according to any of Clauses 1-21, wherein the plurality of electrodes is configured to deliver electrical pulses for irreversible electroporation, the pulses having a peak voltage of at least 900 volts (V).

Clause 23: The medical probe according to any of Clauses 1-22, wherein the plurality of spines is configured to form an approximately spherically-shaped basket assembly when in the expanded form.

Clause 24: The medical probe according to any of Clauses 1-22, wherein the plurality of spines is configured form an approximately oblate-spheroid basket assembly when in the expanded form.

Clause 25: The medical probe according to any of Clauses 1-24, further comprising spray ports configured to deliver an irrigation fluid to the plurality of electrodes.

Clause 26: The medical probe according to any of Clause 1-25, further comprising a plurality of electrically insulative jackets each disposed between a respective spine of the plurality of spines and a respective electrode of the plurality of electrodes, thereby electrically isolating the plurality of electrodes from the plurality of spines.

Clause 27: The medical probe according to Clause 26, wherein each of the electrically insulative jackets of the plurality of electrically insulative jackets comprises a first lumen and a second lumen, the first lumen configured to receive a first wire and the second lumen configured to receive the respective spine.

Clause 28: The medical probe according to any of Clauses 26 or 27, wherein a cross-sectional shape of each electrically insulative jacket comprises a substantially trapezoidal shape.

Clause 29: A method of constructing a medical probe, the method comprising: aligning a spine of an expandable basket assembly with an electrode of the expandable basket assembly, the spine comprising a proximal end, a distal end, and a strut having a mechanical retainer; inserting the spine into a lumen of the electrode; and pushing the spine into the lumen of the electrode until the mechanical retainer engages with the electrode to prevent the electrode from sliding proximally or distally along a length of the spine.

Clause 30: The method according to Clause 29, wherein the mechanical retainer of the strut comprises one or more protrusions extending outwardly from the strut to form a lip, and wherein pushing the spine into the lumen of the electrode until the mechanical retainer engages with the electrode comprises pushing the spine into the lumen of the electrode until the lip is positioned to prevent the electrode from sliding proximally or distally along the length of the spine.

Clause 31: The method according to Clause 30, wherein the strut comprises a first and a second strut each comprising a respective protrusion of the one or more protrusions, and wherein pushing the spine into the lumen of the electrode until the mechanical retainer engages with the electrode comprises pushing the spine into the lumen of the electrode to cause the first and second struts to compress toward each other to allow the respective protrusions to slide through the lumen of the electrode.

Clause 32: The method according to Clause 31, wherein the first and second struts each comprise a respective pair of protrusions of the one or more protrusions, each pair of protrusions comprising a first protrusion and a second protrusion, and wherein pushing the spine into the lumen of the electrode until the mechanical retainer engages with the electrode comprises pushing the spine into the lumen of the electrode to cause the first protrusion to be positioned on a first side of the electrode and the second protrusion to be positioned on a second side of the electrode so that the pair of protrusions prevent the electrodes from sliding proximally or distally along the length of the spine.

Clause 33: The method according to any one of Clauses 29-32, wherein the mechanical retainer of the strut comprises a bend forming a spring bias in the strut, the spring bias causing the strut to form a friction fit with the electrode and prevent the electrode from sliding along the length of the spine, and wherein pushing the spine into the lumen of the electrode until the mechanical retainer engages with the electrode comprises pushing the spine into the lumen of the electrode until the bend is positioned to prevent the electrode from sliding proximally or distally along the length of the spine.

Clause 34: The method according to Clause 33, further comprising: positioning the bend to extend from proximate a first end of the electrode to proximate a second end of the electrode to cause the strut to form the friction fit at a first portion and a second portion of an inner surface of the electrode.

Clause 35: The method according to Clause 33, further comprising: positioning the bend to extend from a first distance beyond a first end of the electrode to a second distance beyond a second end of the electrode to cause the strut to form the friction fit at an inner surface of the electrode and an outer edge of the electrode.

Clause 36: The method according to Clause 29, wherein the spine comprises a first electrode and a second electrode and the mechanical retainer comprises a first mechanical retainer and a second mechanical retainer, the method further comprising: aligning the spine of the expandable basket assembly with the first electrode and the second electrode; inserting the spine into a lumen of the first electrode and a lumen of the second electrode; pushing the spine into the lumen of the first electrode until the first mechanical retainer engages with the first electrode to prevent the first electrode from sliding proximally or distally along a length of the spine; and pushing the spine into the lumen of the second electrode until the second mechanical retainer engages with the second electrode to prevent the second electrode from sliding proximally or distally along a length of the spine.

Clause 37: The method according to any one of Clauses 29-36, further comprising: securing the mechanical retainer to the electrode by an interference fit.

Clause 38: The method according to any of Clauses 29-37, wherein the lumen comprises a relief configured to receive a wire of the medical probe.

Clause 39: The method according to Clause 38, wherein the wire is insulated from the strut.

Clause 40: The method according to any of Clauses 38 and 39, further comprising: electrically connecting the wire to the electrode.

Clause 41: The method according to any of Clauses 38-40, wherein at least a portion of the wire comprises an electrically conductive core material comprising a first electrical conductivity, an electrically conductive cover material comprising a second electrical conductivity less than the first electrical conductivity, the electrically conductive cover material circumscribing the electrically conductive core material, and an insulative jacket circumscribing the electrically conductive cover material.

Clause 42: The method according to any of Clauses 38-41, wherein at least a portion of the wire comprises a plurality of strands and an insulative jacket circumscribing the plurality of the strands, and wherein each strand of the plurality of strands respectively comprises an electrically conductive core material comprising a first electrical conductivity and an electrically conductive cover material comprising a second electrical conductivity less than the first electrical conductivity, the electrically conductive cover material circumscribing the electrically conductive core material.

Clause 43: The method according to any of Clauses 29-42, wherein the strut comprises a material selected from a group consisting of nitinol, cobalt chromium, stainless steel, titanium.

Clause 44: The medical probe according to any of Clauses 1-16, wherein the strut comprises a polymer.

Clause 45: The method according to any of Clauses 29-44, wherein the electrode comprises a ring type electrode.

Clause 46: The method according to any of Clauses 29-44, wherein the electrode comprises a bulging type electrode.

Clause 47: The method according to any of Clauses 29-44, wherein the electrode comprises a rectangular electrode.

Clause 48: The method according to any of Clauses 29-47, further comprising: configuring the electrode to deliver electrical pulses for irreversible electroporation, the pulses having a peak voltage of at least 900 volts (V).

Clause 49: The method according to any of Clauses 29-48, further comprising: configuring the plurality of spines to form an approximately spherically-shaped basket assembly.

Clause 50: The method according to any of Clauses 29-49, further comprising: configuring the plurality of spines to form an approximately oblate-spheroid-shaped basket assembly.

Clause 51: The method according to any of Clauses 29-50, further comprising: configuring spray ports to deliver an irrigation fluid to the electrode.

Clause 52: The method according to any of Clause 29-50, further comprising: positioning each spine of the plurality of spines through a first lumen of an electrically insulative jacket; positioning a wire through a second lumen of the electrically insulative jacket; positioning the electrode over the electrically insulative jacket; and electrically connecting the wire to the electrode through an aperture in the electrically insulative jacket providing passage between the second lumen and the electrode.

Clause 53: The method according to Clause 52, wherein a cross-sectional shape of the electrically insulative jacket comprises a substantially trapezoidal shape.

The embodiments described above are cited by way of example, and the present invention is not limited by what has been particularly shown and described hereinabove. Rather, the scope of the invention includes both combinations and sub combinations of the various features described hereinabove, as well as variations and modifications thereof which would occur to persons skilled in the art upon reading the foregoing description and which are not disclosed in the prior art.

What is claimed is:

1. A medical probe, comprising:
    a tubular shaft having a proximal end and a distal end, the tubular shaft extending along a longitudinal axis; and
    an expandable basket assembly coupled to the distal end of the tubular shaft, the basket assembly comprising:
        a plurality of electrodes, each electrode of the plurality of electrodes having a lumen therethrough; and
        a plurality of spines extending along the longitudinal axis and configured to bow radially outward from the longitudinal axis when the expandable basket assembly is transitioned from a collapsed form to an expanded form, each spine of the plurality of spines comprising:
            a proximal end;
            a distal end;
            a first strut and a second strut each passing through the lumen of an electrode of the plurality of electrodes, the first strut and the second strut each comprising a respective protrusion and being configured to be compressible toward each other to allow the respective protrusions to slide through the lumen of the electrode; and
            a third strut positioned between the first strut and the second strut, the third strut comprising a bend forming a spring bias in the third strut to form a friction fit with the electrode, each of the first strut, the second strut, and the third strut being configured to prevent the electrode from sliding proximally or distally along a length of the spine.

2. The medical probe according to claim 1, wherein the first and second struts each comprise a respective pair of protrusions of the one or more protrusions, each pair of protrusions comprising a first protrusion positioned on a first side of the electrode and a second protrusion positioned on a second side of the electrode such that each pair of protrusions prevent the electrode from sliding proximally or distally along the length of the spine.

3. The medical probe according to claim 1, wherein the bend of the third strut extends from proximate a first end of the electrode to proximate a second end of the electrode to cause the third strut to form the friction fit at a first portion and a second portion of an inner surface of the electrode.

4. The medical probe according to claim 1, wherein the bend extends from a first distance beyond a first end of the electrode to a second distance beyond a second end of the electrode to cause the third strut to form the friction fit at an inner surface of the electrode and an outer edge of the electrode.

5. The medical probe according to claim 1,
    wherein the first strut and the second struts strut each comprise a bend forming a spring bias in the first strut and the second strut.

6. The medical probe according to claim 1, wherein each spine of the plurality of spines comprises a first electrode of the plurality of electrodes and a second electrode of the plurality of electrodes, and
    wherein the protrusion of the first strut and the second strut comprises a first protrusion and each of the first strut and the second strut further comprise a second protrusion, the first protrusion being configured to engage with the first electrode of the plurality of electrodes and the second protrusion being configured to engage with the second electrode of the plurality of electrodes, the first protrusion and the second protrusion being configured to prevent the first electrode of the plurality of electrodes and the second electrode of the plurality of electrodes from sliding proximally or distally along a length of the spine when the first protrusion and the second protrusion are engaged with the first and second electrodes of the plurality of electrodes, respectively.

7. The medical probe according to claim 1, wherein the each spine of the plurality of spines further comprises an interference fitting with a respective electrode of the plurality of electrodes.

8. The medical probe according to claim 1, wherein the spine comprises a material selected from a group consisting of nitinol, cobalt chromium, stainless steel, titanium.

9. The medical probe according to claim 1, wherein the spine comprises a polymer.

10. The medical probe according to claim 1, wherein the plurality of electrodes is configured to deliver electrical pulses for irreversible electroporation, the pulses having a peak voltage of at least 900 volts (V).

11. The medical probe according to claim 1, further comprising spray ports configured to deliver an irrigation fluid to the plurality of electrodes.

12. The medical probe according to claim 1, further comprising a plurality of electrically insulative jackets each disposed between a respective spine of the plurality of spines and a respective electrode of the plurality of electrodes, thereby electrically isolating the plurality of electrodes from the plurality of spines.

13. A method of constructing a medical probe, the method comprising:
    aligning a spine of a plurality of spines of an expandable basket assembly with an electrode of a plurality of electrodes of the expandable basket assembly basket assembly, the spine comprising a proximal end, a distal end, a first strut, a second strut, and a third strut, the first strut and the second strut comprising a respective protrusion and configured to be compressible toward each other, the third strut being positioned between the first strut and the second strut and comprising a bend forming a spring bias in the third strut to form a friction fit with the electrode;

inserting the spine into a lumen of the electrode; and pushing the spine into the lumen of the electrode until the first strut, second strut, and third strut each engage with the electrode to prevent the electrode from sliding proximally or distally along a length of the spine.

14. The method according to claim 13, wherein the first strut and the second strut each comprise a respective pair of protrusions, each pair of protrusions comprising a first protrusion and a second protrusion, and wherein pushing the spine into the lumen of the electrode until the first strut, second strut, and third strut each engage with the electrode comprises pushing the spine into the lumen of the electrode to cause the first protrusion to be positioned on a first side of the electrode and the second protrusion to be positioned on a second side of the electrode so that the pair of protrusions prevent the electrodes from sliding proximally or distally along the length of the spine.

* * * * *